(12) United States Patent
Farahat et al.

(10) Patent No.: US 9,999,323 B2
(45) Date of Patent: Jun. 19, 2018

(54) AUTHENTICATION READER AND A DISPENSER COMPRISING THE AUTHENTICATION READER

(71) Applicant: SUN CHEMICAL CORPORATION, Parsippany, NJ (US)

(72) Inventors: Mohammad Farahat, Wyckoff, NJ (US); Jessica Blatt, Hoboken, NJ (US); Sidney Persley, Laurence Harbor, NJ (US); Charles Achkar, Cresskill, NJ (US); Stephen Postle, Glen Rock, NJ (US); Danny Rich, Trenton, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days. days.

(21) Appl. No.: 15/708,814

(22) Filed: Sep. 19, 2017

(65) Prior Publication Data

US 2018/0028025 A1    Feb. 1, 2018

Related U.S. Application Data

(63) Continuation-in-part of application No. 15/453,789, filed on Mar. 8, 2017, which is a continuation of
(Continued)

(30) Foreign Application Priority Data

Oct. 20, 2011   (GB) .................................. 1118109.6

(51) Int. Cl.
*G06K 19/00* (2006.01)
*A47K 5/12* (2006.01)
*B05B 9/08* (2006.01)
*G07F 13/02* (2006.01)
*G07F 17/18* (2006.01)

(52) U.S. Cl.
CPC ............ *A47K 5/1217* (2013.01); *B05B 9/085* (2013.01); *G07F 13/025* (2013.01); *G07F 17/18* (2013.01)

(58) Field of Classification Search
USPC ........................................ 235/435, 439, 454
See application file for complete search history.

(56) References Cited

U.S. PATENT DOCUMENTS

| 4,756,557 A | 7/1988 | Kaule |
| 5,842,603 A | 12/1998 | Schroeder |

(Continued)

FOREIGN PATENT DOCUMENTS

| DE | 10254248 A1 | 6/2004 |
| EP | 1671568 | 6/2006 |

(Continued)

OTHER PUBLICATIONS

International Search Report issued in PCT Application PCT/US2015/054995, dated Feb. 1, 2016.
(Continued)

*Primary Examiner* — Matthew Mikels
(74) *Attorney, Agent, or Firm* — Charles C. Achkar; Ostrolenk Faber LLP

(57) ABSTRACT

An authentication reader and a dispenser comprising the authentication reader for authenticating a product having a taggant ink disposed on the product's surface.

17 Claims, 16 Drawing Sheets

Related U.S. Application Data application No. 14/122,671, filed as application No. PCT/GB2012/051186 on May 25, 2012, now Pat. No. 9,642,501, application No. 15/708,814, which is a continuation-in-part of application No. 14/880,079, filed on Oct. 9, 2015.

(60) Provisional application No. 61/490,691, filed on May 27, 2011, provisional application No. 62/062,425, filed on Oct. 10, 2014.

(56) References Cited

U.S. PATENT DOCUMENTS

| | | | |
|---|---|---|---|
| 5,903,340 | A | 5/1999 | Lawandy |
| 5,941,572 | A | 8/1999 | Gundjian |
| 5,974,150 | A | 10/1999 | Kaish |
| 5,974,950 | A | 11/1999 | King |
| 6,005,960 | A | 12/1999 | Moore |
| 6,006,991 | A | 12/1999 | Faklis et al. |
| 6,354,501 | B1 | 3/2002 | Outwater |
| 6,402,986 | B1 | 6/2002 | Jones, II |
| 6,701,304 | B2 | 3/2004 | Leon |
| 6,993,655 | B1 | 1/2006 | Hecht |
| 7,079,230 | B1 | 7/2006 | McInerney |
| 7,325,479 | B2 | 2/2008 | Laigneau |
| 7,488,954 | B2 | 2/2009 | Ross |
| 7,620,527 | B1 | 11/2009 | Gielis |
| 8,071,933 | B2 | 12/2011 | Ophardt et al. |
| 8,194,914 | B1 | 6/2012 | Skogg et al. |
| 8,335,491 | B1 | 12/2012 | Kovach |
| 8,403,223 | B2 | 3/2013 | Lewis et al. |
| 9,476,826 | B2 | 10/2016 | Izmailov |
| 2002/0025490 | A1 | 2/2002 | Shchegolikhin |
| 2002/0048621 | A1 | 4/2002 | Boyd |
| 2002/0134831 | A1 | 9/2002 | Saveliev |
| 2002/0135768 | A1 | 9/2002 | Sugiyama |
| 2002/0143860 | A1 | 10/2002 | Catan |
| 2003/0006281 | A1 | 1/2003 | Thomas |
| 2003/0035564 | A1 | 2/2003 | Honsinger |
| 2003/0039195 | A1 | 2/2003 | Long |
| 2003/0063772 | A1 | 4/2003 | Smith |
| 2003/0195820 | A1 | 10/2003 | Silverbrook |
| 2003/0218739 | A1 | 11/2003 | Saglimbeni |
| 2004/0079807 | A1 | 4/2004 | Lapstun |
| 2004/0112962 | A1* | 6/2004 | Farrall ............... G06K 7/12 235/462.01 |
| 2004/0120861 | A1 | 6/2004 | Petroff |
| 2004/0188528 | A1 | 9/2004 | Alasia |
| 2004/0231554 | A1 | 11/2004 | Udagawa et al. |
| 2005/0015348 | A1 | 1/2005 | Knepler |
| 2005/0060171 | A1 | 3/2005 | Molnar |
| 2005/0127090 | A1 | 6/2005 | Sayers et al. |
| 2006/0131517 | A1 | 6/2006 | Ross |
| 2006/0163354 | A1 | 7/2006 | Tyranski |
| 2006/0180792 | A1 | 8/2006 | Ricci |
| 2007/0111315 | A1 | 5/2007 | Maruvada |
| 2007/0161115 | A1 | 5/2007 | Schwartz |
| 2007/0215239 | A1 | 9/2007 | Dorney |
| 2007/0235533 | A1* | 10/2007 | Giordano ............... G06Q 20/18 235/383 |
| 2008/0025594 | A1 | 1/2008 | Metzger |
| 2009/0072526 | A1 | 2/2009 | Peters et al. |
| 2009/0141961 | A1 | 6/2009 | Smith |
| 2009/0177315 | A1 | 7/2009 | Goeking |
| 2009/0218805 | A1 | 9/2009 | Haushalter |
| 2009/0231572 | A1 | 9/2009 | Emerich |
| 2010/0025476 | A1 | 2/2010 | Widzinski, Jr. |
| 2010/0067056 | A1 | 3/2010 | Rich |
| 2010/0149531 | A1 | 6/2010 | Tang |
| 2011/0170145 | A1 | 7/2011 | Govyadinox et al. |
| 2011/0183710 | A1 | 7/2011 | Selva |
| 2011/0253744 | A1 | 10/2011 | Pelfrey |
| 2011/0260828 | A1 | 10/2011 | Zhang |
| 2012/0024956 | A1 | 2/2012 | Chen |
| 2012/0205449 | A1 | 8/2012 | Lewis |
| 2012/0261606 | A1 | 10/2012 | Hollman |
| 2013/0026239 | A1 | 1/2013 | Sakahashi et al. |
| 2013/0048874 | A1 | 2/2013 | Rapaport |
| 2013/0284029 | A1 | 10/2013 | Reed et al. |
| 2013/0301870 | A1 | 11/2013 | Mow et al. |
| 2014/0082854 | A1 | 3/2014 | Landa |
| 2014/0197192 | A1 | 7/2014 | Atkins et al. |
| 2014/0231448 | A1 | 8/2014 | Wegelin |
| 2014/0231449 | A1 | 8/2014 | Wegnelin |
| 2015/0201790 | A1 | 7/2015 | Smith |
| 2016/0027042 | A1 | 1/2016 | Heeter |
| 2016/0174757 | A1 | 6/2016 | Rivera |

FOREIGN PATENT DOCUMENTS

| | | |
|---|---|---|
| EP | 1824760 | 8/2007 |
| EP | 2033555 A1 | 11/2009 |
| GB | 2376682 A | 12/2002 |
| JP | 2004237489 A | 8/2004 |
| WO | 9636557 A1 | 11/1996 |
| WO | 93636556 A1 | 11/1996 |
| WO | 0106453 A1 | 1/2001 |
| WO | 2009086120 | 7/2009 |

OTHER PUBLICATIONS

Written Opinion issued in PCT Application PCT/US2015/054995, dated Feb. 1, 2016.
Currency.gov, "$100 Note Issused 2013—present," available at https://uscurrency.gov/sites/default/files/security/pdf/100_2013_Features.pdf (accessed Jan. 20, 2016).
International Search Report and Written Opinion dated Aug. 27, 2012 for priority application PCT/GB2012/051186.
Combined Search and Examination Report dated Feb. 8, 2012 for priority Application No. GB1118109.6.
Supplementary Search Report issued in European Counterpart Application 15 84 8238 dated Feb. 23, 2018.
Related Application Statement of Feb. 15, 2018.

\* cited by examiner

KEY FOR FIGS. 18 to 29

▓ CONVENTIONAL INK  ╲╲╲ VISIBLE TAGGANT INK  ∗∗∗∗ INVISIBLE TAGGANT INK

INVISIBLE TAGGANT INK OVERLAY

VISIBLE TAGGANT INK OVERLAY

AUTHENTICATION READER AND A DISPENSER COMPRISING THE AUTHENTICATION READER

CROSS REFERENCE TO RELATED APPLICATIONS

This application is a continuation in part of U.S. patent application Ser. No. 15/453,789, filed Mar. 8, 2017, which is a continuation of U.S. patent application Ser. No. 14/122,671, filed 12 Mar. 2014 (now U.S. Pat. No. 9,642,501), which is a U.S. National Stage of International Application No. PCT/GB2012/051186, filed 25 May 2012, which claims the benefit of U.S. Provisional Patent Application No. 61/490,691, filed 27 May 2011, and GB 1118109.6, filed 20 Oct. 2011, and this application is a continuation in part of U.S. patent application Ser. No. 14/880,079, filed Oct. 9, 2015, which claims priority to U.S. Provisional Patent Application Ser. No. 62/062,425 filed Oct. 10, 2014, all of which are incorporated herein by reference in their entirety and for all purposes.

FIELD

The present invention is directed to an authenticating apparatus, system and a method for authentication of an object or product.

BACKGROUND

The present invention relates to a dispenser for dispensing a product.

In particular, it relates to a dispenser of the kind having a base unit containing a dispensing mechanism and a refill which is removably insertable into the base. In some embodiments, a refill takes the form of a product container such as a coffee brewing cup.

Such dispensers can be used, for example, for dispensing fluids. These may be liquid soaps and the like, or may be used to dispense fluid food stuff such as coffee or sauces with a mustard or ketchup-like consistency. They may also be aerosol type dispensers for dispensing air freshener and the like, or dispensers for solid objects such as tabs, lozenges or wipes.

With such dispensers, there is a general desire to authenticate the refill which is placed in the dispenser in order to maintain quality control, and for safety reasons, to prevent dispensing a sub-standard or hazardous product.

Systems and methods have been employed to prevent or reduce counterfeiting, infringement and the parallel importing of objects and products carrying a valuable piece of intellectual property, such as a company name, logo, image, brand, copyright or trademark.

Most systems and methods contain one or more protection features in the form of security or authentication measures classified into three types of object or product authenticity protection, each offering a different level of security. These are referred to in the security industry as a "Level 1" (readable by an ordinary citizen), Level 2" (machine-readable with immediate response) and "Level 3" (machine readable with dedicated tools where the response is not readily obtainable in real time, or other forensic means) security measures.

A Level 1 security measure involves the use of features that can be recognized overtly, e.g. by sight or touch by an end user of the object or product. Such features include holograms and markings by optically variable ink. In the case of a hologram, one is looking for a specially designed holographic pattern and in the case of an optically variable ink, the marked pattern shows different colors when viewed at different angles.

A Level 2 security measure involves the use of covert or semi-covert features that require interrogation by a simple and easily obtainable detection device. Examples include printed sectors in banknotes bearing fluorescent marks made from inks containing downconverter and upconverter taggants. In this case, one only needs an ultraviolet or infra-red laser interrogation source for verification of an object or product having the ink applied. When light in an appropriate waveband is illuminated onto the ink containing taggant, due to the taggant, the ink will emit visible light, which can be observed readily by the naked-eye. Alternatively, the ink may, due to the taggant, emit radiation of a wavelength invisible to the naked-eye, but readable and verifiable by a suitable reader.

Finally, a Level 3 security measure involves the use features that are generally known only to the brand or currency manufacturer of an object or product and can be verified, usually not in real time, by dedicated interrogation tools that cannot be readily obtained commercially in the marketplace.

US 2010/0149531 is directed to a Level 2 authentication measure and describes an authentication method for an object or product containing an image, where the image contains or forms part of a taggant used in a coded readable security feature. The coded readable feature is subject to an authentication process that identifies and verifies the object or product. However, because the taggant represents the only source of the identification and authentication security feature, and given that the machine readable security feature of the image is coded, it therefore does not contain or form part of an intellectual property protected feature. As a result, a counterfeiter would find it relatively easy to introduce counterfeit or infringing objects or products containing or using the coded image into the commercial stream where such objects and products are marketed and sold. For example, a counterfeiter could evaluate and ultimately determine how to identify, source and formulate the taggant, reproduce the coded security feature of the image and apply it to a copied or counterfeit object or product, then introduce such object or product into the commercial stream.

Alternatively, a counterfeiter could evaluate and ultimately determine how to decode and reprogram the authenticating reader used to read the existing coded security feature of the image containing or forming part of the taggant so that it reads the counterfeiter's coded image. By adopting either or both of these approaches, a counterfeiter could successfully circumvent the authentication process or measures being used by the owner or marketer of the object or product without having infringed any intellectual property right of the owner or marketer in the object or product.

U.S. Pat. No. 8,403,223 is also directed to a Level 2 security measure and describes an authentication method for textiles containing two invisible designs having readable features and used to identify, authenticate and track textiles. However, again given that the invisible designs themselves are not, nor do they contain any, intellectual property protected features, the invisible designs serve as the only security feature for identifying and authenticating the textiles. As a result, a counterfeiter would again, find it relatively easy to introduce counterfeit, copied textiles into the commercial stream without having infringed any intellectual property right of the owner or marketer in the textiles.

As for one way of authenticating refills, such as dispenser product containers, is to use a magnet on the refill which is brought into proximity with a reed switch on the base in order to complete a circuit. This is disclosed in EP 1824760. This idea provides a simple and cost-effective authentication system. However, it is easy for a non-authorised refill to be produced simply by providing a magnet at the correct location. Further, the system lacks versatility as the base can only ever detect one type of refill. It cannot be configured to detect different refills in different products.

A further known method of authentication is disclosed in EP 1 671 568 and uses an electronic key, such as an RFID tag. Such tags can be programmed with a unique identifier. The base is then provided with control circuitry which reads the RFID tag and, if it detects that the tag with an authorised code is present, it will allow the dispensing mechanism to operate to dispense liquid. If no such tag is identified, it will prevent operation of the dispensing mechanism. Although such systems are commonly used, they are relatively expensive in that they require each refill to be provided with an RFID tag. In a low-cost system, where every penny which can be shaved off the cost of the refill is critical, this expense can be significant.

Also known in the art are optical systems, such as that disclosed in WO 1996/036556. This is based on bar-code technology and uses a scanning light which scans the barcode to check that the container is authentic, and to obtain information about the nature of the product in the refill which has a bearing on the subsequent operation of the dispenser.

Such devices have a number of drawbacks. The requirement for a bar-code on the refill means that a relatively large area of the product must be taken up with the bar-code which detracts from the appearance of the refill. Also, the physical size of the bar-code, together with the space required for the scanner which detects the bar-code means that the space required for such a system is relatively large. Also, the fact that a bar-code is readily visible in normal use means that it can readily be copied onto an unauthorised product.

Given the size and complexity of such a system, this has generally only been used in relatively large-scale mains-powered machines such as beverage dispensers. As far as we are aware, this has not been used on a smaller scale dispenser, for example, one which is capable of being battery-powered.

WO 2009/086120 discloses a sensor for dispensing sheets of material. It has an authentication reader which reads a mark on the roll as it is dispensed from the dispenser. If it fails to recognise an authentication mark, it determines 30 that the refill is unauthorised and dispenses it at a faster rate. The idea is to deter the use of unauthorised product by ensuring that this is used up at a faster rate. This document discloses a non-exhaustive list of suitable sensors which include barcodes, RFID tags, fluorescent or phosphorescence inks, conductive particles, fibers, metals, tick marks or ridges. Similarly, JP 2004/237489 discloses a roll of thermal paper that is provided with an ink based authentication mark which may be fluorescent or luminescent. In both cases, the dispensers require the roll of material to be moved past the sensor in order to allow the sensor to read the authentication mark. As such, the mark must be continuous or repeat frequently along the length of the material. Both devices are relatively large scale mains powered devices that again require some relative movement in order to function.

Embodiments described herein aim to provide a cost-effective authentication system suitable for use with relatively small-scale, low-cost dispensers.

SUMMARY

In one aspect, the invention provides a dispenser for dispensing a product, the dispenser comprising a base unit containing a dispensing mechanism for dispensing the product; a refill containing the product and being removably insertable into the base in a fixed position in which the product can be dispensed by the dispensing mechanism, the refill having a taggant ink on part of its external surface; the base being provided with a non-scanning light source positioned to illuminate the ink when the refill is inserted into the base in the correct orientation, the light source having a first wavelength and the ink being arranged to cause the ink to emit light at a second different wavelength; a sensor to receive light emitted by the ink upon illumination by the light source; and a control circuit to receive a signal indicative of the wavelength of the detected light from the sensor, compare it with stored data to determine whether the shift in wavelength of the detected light caused by the ink indicates that the refill is authentic, and prevent operation of the dispensing mechanism unless the refill is authentic.

In one embodiment, the product is a fluid.

In another embodiment, more than one ink is printed on part of the external surface of the refill.

In yet another embodiment, the refill has an outlet at its lower end and the ink is printed on the lower end of the refill.

In one embodiment, the ink is a two-part cross-linked formulation.

In a related aspect, the invention provides a refill for a dispenser for dispensing a product, the refill containing product and being removably insertable into a base in a fixed position in which the product can be dispensed by the dispensing mechanism, the refill having a tagged sensor ink on part of its external surface.

In some embodiments, the refill can contain a fluid or a product such as coffee through which a fluid such as water may flow to dispense the coffee.

In another embodiment, the ink is a two-part cross-linked formulation.

In yet another embodiment, the ink is applied by an inkjet printing process. In a different embodiment, the ink is applied by a pad or screen printing process. In another embodiment, the ink is on a label which is stuck to the refill.

In another aspect, the invention provides a method of dispensing a product from the dispenser as described herein, the method comprising: inserting the refill into the base unit; illuminating the light; sensing the light received from the ink; comparing the detected light with stored data to determine whether the shift in wavelength of the detected light caused by the ink indicates that the refill is authentic; and allowing operation of the dispensing mechanism if the refill is authentic.

In yet another aspect, the invention provides a base unit for a dispenser for dispensing a product, the base unit containing a dispensing mechanism for dispensing the product; a means for removably receiving a refill in a fixed position in which the product can be dispensed by the dispensing mechanism, the refill having a taggant ink on part of its external surface; the base being provided with a non-scanning light source positioned to illuminate the ink when the refill is inserted into the base in the correct orientation, the light source having a first wavelength and the ink being arranged to emit light at a second different wavelength; a sensor to receive light emitted by the ink upon illumination by the light source; and a control circuit to receive a signal indicative of the wavelength of the detected light from the sensor, compare it with stored data to determine whether the shift in wavelength of the detected light caused by the ink indicates that the refill is authentic, and prevent operation of the dispensing mechanism unless the refill is authentic.

In another aspect, the present invention provides a secure glyph comprising:
   a) an intellectual property protected feature; and
   b) a machine readable feature having an overt and/or a covert portion;
wherein said intellectual property protected feature is either recognized alone as a machine readable feature, or recognized in combination with at least a portion of the machine readable feature, by an authenticating apparatus to determine authenticity.

Furthermore the present invention also provides an object or product with a secure glyph thereon and a method of producing same comprising providing an object or product and affixing or attaching thereto, printing or coating thereon and/or incorporating therein a secure glyph as herein described above.

The present invention also provides an authenticating apparatus for determining the authenticity of an object or product having a secure glyph thereon comprising:
   a) a database containing associated data corresponding to a signal response from an intellectual property protected feature alone, or combination with a machine readable feature and
   b) an authentication reader having:
     i) a signal generator capable of generating a signal response from an intellectual property protected feature alone or in combination with a machine readable feature on the secure glyph;
     ii) a signal response detector capable of receiving the signal response from the intellectual property protected feature alone, or in combination with the machine readable feature; and
     iii) a signal processing unit (SPU) for comparing the signal response from the detector and the relevant associated data in the database.

The present invention also provides a device with an authenticating apparatus associated therewith, or incorporated therein, for use in combination with an authenticated object or product.

Furthermore, the present invention also provides a process for manufacturing a device with an authenticating apparatus associated therewith, or incorporated therein, for use in combination with an authenticated object or product, wherein the process comprises incorporating the authentication apparatus into the device.

Additionally the present invention provides a method for allowing an object or product having a secure glyph to be accepted and used for a specific intended purpose in a device, the secure glyph comprising:
   a) an intellectual property protected feature; and
   b) a machine readable feature;
   c) wherein said method comprises:
     i) using an authenticating apparatus connected to the device to detect and recognize the intellectual property protected feature alone, or in combination with at least a portion of the machine readable feature of the secure glyph on the object or product; and
     ii) allowing the intended use of the object or product in the device.

The present invention also provides a system for allowing a first article to be used in combination with a second article comprising:
   a) authenticating the first article having a glyph according to the present invention thereon by detecting a characteristic feature of the glyph with a detector;
   b) allowing the first article to be used in combination with the second article.

Finally, the present invention provides an authentication method for determining the authenticity of an object or product wherein a secure glyph for determining authenticity has been affixed or attached thereto, printed or coated thereon and/or incorporated therein, the secure glyph having
   an intellectual property protected feature; and
   a machine readable feature having a covert and/or overt portion;
wherein said intellectual property protected feature is recognized either alone as a machine readable feature; or recognized in combination with at least a portion being a machine readable feature; by an authenticating apparatus to determine authenticity;
   the method comprising
   subjecting the object or product to an authenticating apparatus having:
     (i) a database containing associated data corresponding to a signal response from an intellectual property protected feature alone, or combination with a machine readable feature; and
     (ii) an authentication reader having: a signal generator capable of generating a signal response from an intellectual property protected feature alone or in combination with the machine readable feature on the secure glyph; a signal response detector capable of receiving the signal response from the intellectual property protected feature alone, or in combination with the machine readable feature; and
     a signal processing unit (SPU) for comparing the signal response from the detector and the relevant associated data in the database; and
   acknowledging and using the output from the authentication reader.

The present invention also provides an authenticating apparatus for determining the authenticity of an object or product having a secure glyph thereon comprising.

These and other objects, advantages, and features of the invention will become apparent to those persons skilled in the art upon reading the details of the methods and as more fully described below.

DETAILED DESCRIPTION

Figure 1:
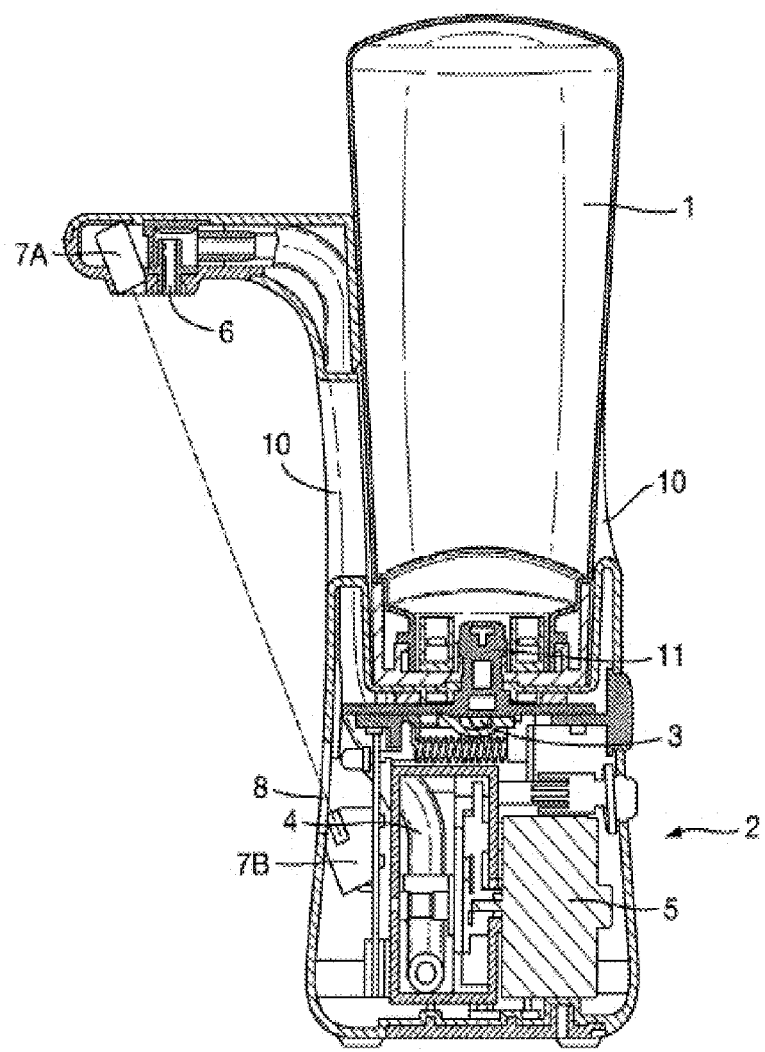
FIG. 1 is a cross-section through the Dettol® NoTouch® product.

As specified in the Background Section, there is a great need in the art to identify technologies for cost-effective authentication systems and use this understanding to develop novel small-scale, low-cost dispensing devices.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or examples. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms "a," "an," and "the" do not denote a limitation of quantity, but rather denote the presence of "at least one" of the referenced item.

Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented. The terms "first," "second," and the like, "primary," "secondary," and the like, do not denote any order, quantity, or importance, but rather are used to distinguish one element from another.

It is noted that terms like "specifically," "preferably," "typically," "generally," and "often" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

Further, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

According to the present invention, there is provided a dispenser for dispensing a product, the dispenser comprising a base unit containing a dispensing mechanism for dispensing the product; a refill containing the product and being removably insertable into the base in a fixed position in which the product can be dispensed by the dispensing mechanism, the refill having a taggant ink on part of its external surface; the base being provided with a light source positioned to illuminate the ink when the refill is inserted into the base in the correct orientation, the light source having a first wavelength and the ink being arranged to cause the ink to emit light at a second different wavelength; a sensor to receive light emitted by the ink upon illumination by the light source; and a control circuit to receive a signal indicative of the wavelength of the detected light from the sensor, compare it with stored data to determine whether the shift in wavelength of the detected light caused by the ink indicates that the refill is authentic, and prevent operation of the dispensing mechanism unless the refill is authentic.

The present invention provides a number of advantages over the known authentication systems.

It is far more secure than a magnet based system or barcode as the taggant inks are impossible, in practice, to copy. This taggant ink also provides for greater security than the inks mentioned in WO 2009/086120 and JP 2004/237489.

The present invention also provides a very low-cost solution, particularly in relation to the refill pack. Given the fixed nature of the refill in the base, only a very small amount of ink is needed. Estimates suggest that the cost of adding a taggant ink to the refill is some 20% of the cost of including an RFID tag. Also, the light source and sensor are relatively cheap as there is no requirement for a scanning source as there is for example, for a barcode system.

The present invention also provides versatility in that different inks can be printed on refills containing different substances and the control circuit can be programmed to detect these different inks and, if necessary, operate the dispensing mechanism differently for the different liquids.

The taggant, also known as a tagged sensor ink, is a high security ink available, for example, from Sun Chemical Security, Gans Ink or Flint Group.

With such an ink, the ink provider also provides the sensor and control circuitry to detect specific characteristic signal emitted by the ink. Such inks are known in high security applications such as document authentication.

The present invention also extends to a refill for a dispenser for dispensing a product, the refill containing product and being removably insertable into a base in a position in which the product can be dispensed by the dispensing mechanism, the refill having a taggant ink on part of its external surface.

The invention also extends to the base unit, per se, and to a method of using the dispenser.

The refill will generally have a non-absorbent surface as it will be made of a material such as plastics or metal. The ink must be securely attached to the reservoir as, if it is accidentally scraped or knocked off when the user inserts the refill into the dispenser. The refill will not work which will be highly irritating.

Therefore, preferably, the ink is a two-part cross-linked epoxy formulation. This has high adhesion properties. This is preferably applied by a pad or screen printing process. It may be a combination of a cross-linked pad print and a flexo solvent formula. Alternatively, the ink is applied by an ink jet printing process. The ink may be cured with UV light. As a further alternative, the ink may be on a label which is stuck to the refill, or applied using an in-mould technique.

One particular application for the present invention is Dettol® No-Touch® dispenser. In such a dispenser, the refill has an outlet at its lower end and is arranged to be inserted with the outlet lowermost into the base. In such a refill, the ink can be printed on the side surface of the lid surface of the refill. However, preferably, the ink is printed on the lowermost surface of the refill. This means that the optical light source and sensor can be positioned where the least amount of ambient light is able to penetrate.

An example of a dispenser and refill in accordance with the present invention will now be described with reference to the accompanying drawings, in which:

FIG. 1 is a cross-section through the Dettol® NoTouch® product; and

Figure 2:
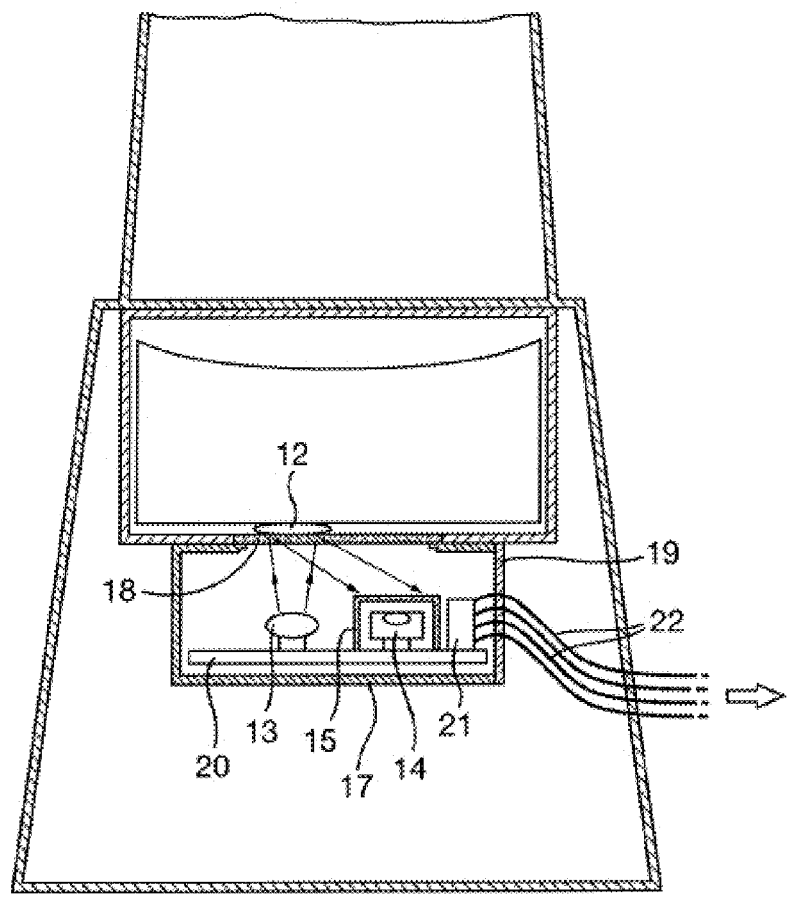
FIG. 2 is a schematic view of the authentication mechanism of the present invention.

FIG. 2 is a schematic view of the authentication mechanism of the present invention.

While the invention is being described with relation to a particular product, it will be appreciated that it may be used for any dispenser in which a refill is removably insertable into a base. It may, for example, be battery-powered or mains powered. It may be free-standing, built-in to a wall or other surround, or be hand-held.

In another example, the product container is a beverage dispensing cup that is inserted into a beverage dispensing machine or brewer. The taggant on the beverage dispensing cup is then subjected interrogation by an authentication apparatus incorporated within the machine.

Upon interrogation, the beverage dispensing cup is subjected to identification and authentication by the machine reader and the process of using the beverage dispensing cup either continues or is halted based on the results of the authentication for the taggant appearing on the lid of the beverage dispensing cup.

Upon authorization of the taggant, the beverage dispenser continues its operation and a beverage is brewed and dispensed.

At the point where the authentication occurs and is verified, the reader may cause a trademark, logo or message to appear on the display screen of the dispensing machine, and additionally a message such as 'ENJOY YOUR GENUINE BREW" or "AUTHENTICALLY BREWED" is also displayed.

The trademark, logo or message continues to appear on the machine's display screen throughout the brewing and dispensing process until completion. The spent brewing cup may then be taken to a second authentication center, where, upon presentation of said spent cup to a second reader, a rebate or prize may be offered to the holder of the spent cup. Upon non-verification of the taggant, the dispensing machine does not brew or dispense a beverage and a message appears on the display screen notifying the user. The unused counterfeit beverage dispensing cup is then either deposited in a repository, or otherwise held or rejected.

The dispenser of FIG. 1 is a hands-free dispenser which is generally suitable for domestic use. The dispenser is primarily intended to dispense liquid soap, but may also be used to dispense other liquid or semi-liquid products (ideally with a viscosity greater than water), such as hand cream, body lotion, moisturiser, face cream, shampoo, shower gel, foaming hand wash, shaving cream, washing up liquid, toothpaste, acne treatment cream, lubricant, a surface cleaner or a sanitising agent such as alcohol gel.

The dispenser comprises two main parts, namely a refill 1 and a base unit 2. The refill 1 provides a reservoir of liquid to be dispensed and is fitted to the base unit 2 as set out below.

The base has an interface 3 into which liquid is dispensed from the refill unit. The interface 3 is in fluid communication with a dispensing tube 4. A pump 5 is selectively operable to pump a metered dose of the liquid along dispensing tube 4 and out of dispensing head 6.

The base has an infrared transmitter 7A which transmits an infrared beam through a window 8 to a receiver 7B to sense the presence of a user's hands in the vicinity of the dispenser. Control circuitry reacts to a signal from the proximity sensor to activate the pump. The illustrated sensor is a break beam sensor, but may also be a reflective sensor. Although an infrared sensor is shown, any known proximity sensor such as a capacitive sensor may be used.

The base unit 2 comprises a cowling 10 which forms a cup-shaped housing surrounding a significant portion of the refill to protect and support it. A spigot 11 projects through the base of the cowling 10 to displace a valve and allow fluid into the base unit 2 for dispensing.

A small spot of a taggant ink is applied to the bottom face of the refill unit (as shown in FIG. 2). Taggant inks are high security inks available, for example, from Sun Chemical Security, Gans Inc. or Flint Group. In such an ink, the optics described below are also provided by the ink provider as they form a complementary pair with the ink.

The refill unit is made from, for example, of polypropylene. This is a type of plastic with relatively low surface energy as determined by DIN 533364 or ASTM D2578 test methods (approximately 29 Dyn/cm), which causes poor adhesion when an ink is printed on it. In order to enhance the adhesion of an ink on polypropylene, its surface energy needs to be raised above that of the ink. For an organic solvent based ink, the surface energy of the polypropylene surface should increase above 40-42 Dyn/cm in order to achieve good adhesion. In addition, use of a highly cross-linked ink will also enhance adhesion on polypropylene. High cross linking may be achieved by using two part inks that consist of a base ink and a cross linking promoting additive.

As shown in FIG. 2, the base is provided with a blue LED 13. Next to the blue LED 13 is a sensor 14 covered by a filter 15 to cut-out light reflected or scattered from the LED. In this case, the filter is orange to cut out the blue light.

The combination of the LED 13, sensor 14 and filter 15 are contained within a housing 17 which has a window 18 through which the light is transmitted to and received from a small spot of taggant ink 12 located at the bottom face of the refill unit. The side of the housing 17 is formed as a separate part 19 to the remainder of the housing. The above described components are mounted on a circuit board 20 which is slid into the housing which is then sealed by the side part 19 of the housing. The circuit board has a plug 21 from which cables 22 extend via a seal in the side part 19 of the housing.

When the refill 1 is inserted into the base unit, the position of the refill is fixed such that the two are precisely aligned so that the taggant ink 12 faces the optics in the base unit preserving the arrangement shown in FIG. 2. The refill is fixed in the sense that it does not move with respect to the base during the dispensing operation. Before authentication, the dispenser may dispense once to prime the pump. In this position, light from the LED is incident on the taggant ink 12. To calibrate the device to allow for ambient light, the LED is turned on and off. The "off" reading is then used by the controller to subtract the ambient light reading from the signal from the sensor when the LED is on. The ink causes the wavelength of the light to be altered. The emitted light is then detected by the sensor 14.

Control circuitry then compares the signal received by the sensor 14 with stored data representing a wavelength and/or intensity value associated with the fluorescent ink on an authentic refill. In the case of taggant ink (also known as a tagged sensor ink), the signature for a particular tagged sensor ink is initially determined by spectroscopic and mathematical analysis of the wavelength and/or intensity data obtained on various samples that are printed on with the tagged sensor ink. Subsequently, this signature is programmed into the control circuitry of the dispensing device. If the signals from sensor 14 satisfy the test conditions that are represented by the stored signature, the control circuit enables the operation of the dispensing mechanism. If the signal fails, the unit will repeat the process a number of times before providing an error indication such as a flashing light and it does not operate the dispensing mechanism. The light will flash for a short while and then the dispenser will return to a standby mode in which it will again attempt its authentication routine if the infrared beam is broken.

A further embodiment of the present invention provides a secure glyph, an object or product with a secure glyph thereon, a method of producing the object or product, an authenticating apparatus, a device incorporating the authenticating apparatus, a process for manufacturing the device, a method for authorizing and/or allowing the use of the object or product with the machine and thus a preventing or inhibiting the use of an unauthorized/non authentic object or product and an authentication method.

Attempts have been made to prevent the use of an unauthorized object or product by positioning an identifier, either on the object or product directly or on a substrate associated with the object or product such as a lid or label, which can be detected by the detector. Thus the use of the object or product is only permissible when the authentication reader recognizes the identifier.

It had previously been thought that an identifier employing a Level 2 security measure was unique and/or constituted trade secret information and could not be hacked, copied or otherwise reproduced. However, a problem arises when the identifier can be reproduced, even if periodically reconfigured or reformulated, to a required degree of accuracy to enable unauthorized producers, suppliers and/or dealers to position the identifier onto a non authentic object or product to be detected by a detector and thereby allow the use of the non authentic object or product with a device.

Furthermore even if the identifier is the subject of patent protection, such as a unique taggant formulation, it is then difficult and very involved to prove that anyone reproducing such a formulation is, in fact, infringing the patent.

The present invention solves the above mentioned problem by employing a secure glyph having a machine readable feature and an intellectual property protected feature that can be employed to prove infringement of the intellectual property feature of the secure glyph and enable the owner of the intellectual property right to prove the counterfeiting or unauthorized copying or reproduction of the object or product.

Therefore unauthorized producers, suppliers and/or dealers attempting to reproduce the secure glyph are deterred from doing so given they would immediately become liable for the unauthorized use of the intellectual property feature of the secure glyph and subject themselves to intellectual property infringement proceedings and the associated remedies upon counterfeiting, copying or reproducing and/or using the secure glyph.

Thus the present invention is capable of extending the life span of the security protection measure, such as a taggant subject to utility patent protection, afforded a trademark owner, given that in most cases, utility patent protection is limited to a 20 year lifespan, whereas trademark protection has an unlimited life. This particular aspect is advantageous given that it is not uncommon for an object or product to have a marketplace life span that exceeds the life span of any utility patent coverage for an object or product in the marketplace.

The term "glyph" as used herein defines an elemental symbol having a design feature within an agreed set of symbols, intended to represent a readable (e.g. machine readable) feature for the purposes of writing and thereby expressing or conveying thoughts, ideas and concepts. Glyphs are considered to be unique marks that collectively can add up to the spelling of a word or otherwise contribute to a specific meaning of what is written, with that meaning dependent on cultural, social and/or societal usage.

The term "secure glyph" as used herein defines an element that has an intellectual property protected feature and a machine readable feature.

Intellectual Property Protected Feature

The intellectual property protected feature is herein defined as a feature that is represented and protectable or is protected by, for example, at least one intellectual property right, such as a trademark, trade secret, copyright or a registered design.

In particular, the intellectual property protected feature of the glyph may, for example, be a copyrighted jingle that is immediately played upon interrogation of the glyph by an authenticating apparatus.

The intellectual property protected feature is preferably recognizable by at least one unassisted human sense. Thus the intellectual property protected feature may be visually recognizable with the human eye, audibly recognizable, olfactory recognizable and/or recognizable by touch. When the intellectual property protected feature is recognizable by at least one unassisted human sense it is considered to be "overt". Alternatively, recognition of the intellectual property protected feature may require the use of a detector when it cannot be recognized by at least one unassisted human sense and is thus considered "covert". The intellectual property protected feature may also comprise an overt and/or a covert portion.

In particular, the intellectual property protected feature could be a phrase or slogan that is protected by copyright, a scent, image or design protected by a trademark or a trade secret.

Usually, the intellectual property protected feature is recognizable with the naked eye and preferably is the subject of a registered trademark.

Wherein the intellectual property protected feature is a trademark the secure glyph is considered a "trademark glyph" which is a particular type of secure glyph, specifically designed to be representative of a registered trademark, trade name or logo, and that is, or is capable of being, affixed or attached, printed or coated and/or incorporated into an object or product requiring authentication.

The intellectual property protected feature and the machine readable feature may each be recognized alone, or in combination or association with each other by an authenticating apparatus to determine authenticity of the secure glyph.

The intellectual property protected feature may be recognized by the authentication reader based on its shape, geometry and/or symmetry.

In a particular embodiment of the invention at least one machine readable feature is either positioned within the intellectual property protectable feature, constitutes the entire intellectual property protected feature or constitutes only a discrete portion or section of the intellectual property protected feature.

The machine readable feature of the secure glyph may also have an overt portion and/or a covert portion.

Secure Glyph

In a further embodiment of the present invention the entire secure glyph may constitute an intellectual property protected feature which may be formed from a machine readable feature.

The secure glyph in its entirety may be invisible to the "naked eye" i.e. when both the intellectual property protected feature and the machine readable feature both only have covert portions or may be visible to the "naked-eye" i.e. when either the intellectual property protected feature and/or the machine readable feature have at least one overt portion.

Furthermore the secure glyph may be any geometrical form or pattern such as a mark, trademark, logo, character, alphanumeric, drawing, picture, semiotic, pictogram, hieroglyph, symbol, image, geometric object and/or an embossed or deformed area.

The secure glyph design typically has a sufficiently high degree of rotational symmetry, also known as "n-fold rotational symmetry" such that the position of the secure glyph is not critical to its recognition.

Wherein the authentication reader is capable of reading only a single pixel or very few pixels of information, then the secure glyph would require an infinite number of degrees of rotational symmetry, such as a circular dot or ring, whilst the authentication reader is capable of reading 2 or 3 pixels could reliably recognize a regular hexagon, which would have six degrees of rotational symmetry.

Preferably, the secure glyph has at least 3 degrees of rotational symmetry, more preferably at least 4 degrees of symmetry and advantageously at least 6 degrees of rotational symmetry.

Thus in one embodiment of the present invention the secure glyph comprises a plurality of features of sufficiently high degree of rotational symmetry such that one or all may be read by the authentication reader.

Figure 5:
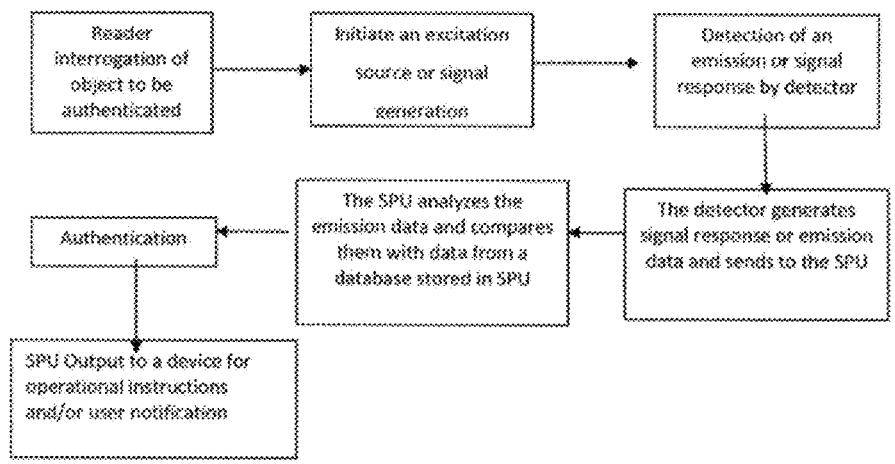
FIG. 5 shows a typical object or product authentication work flow according to a particular embodiment of the present invention.
Figure 6:
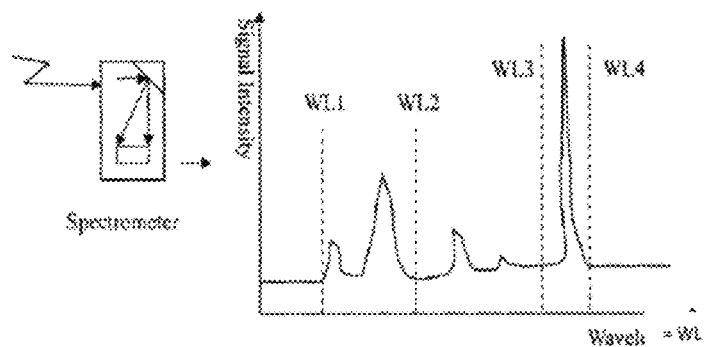
FIG. 6 illustrates the spectral range to scan in order to identify a specific taggant material. In this illustration there are 2 taggants one scanning from WL1 to WL2 to read taggant 1 and one from WL3 to WL4 to read taggant 2.
Figure 7:
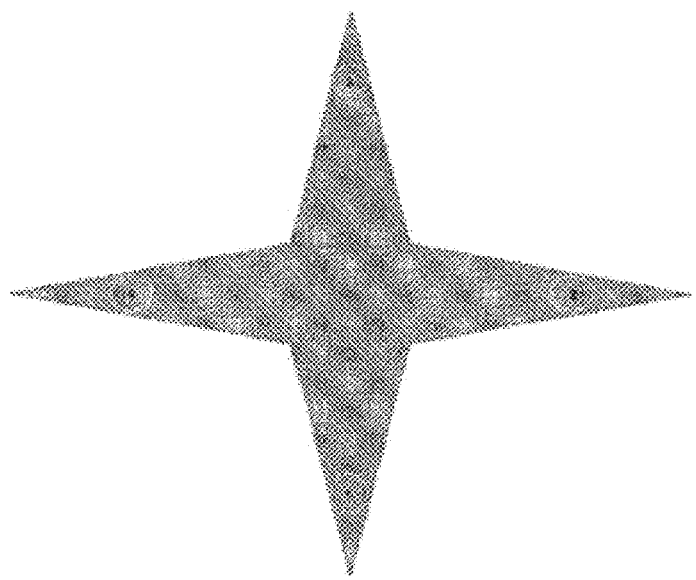
FIG. 7 illustrates a secure glyph with 4-fold rotational symmetry and four readers to identify the geometric design, its position and other graphics of the secure glyph.
Figure 8:
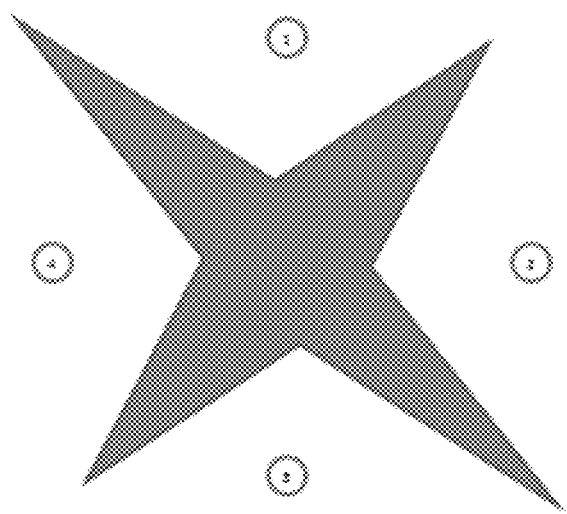
FIG. 8 illustrates a secure glyph with 4-fold rotational symmetry and four readers in which the secure glyph has been rotated to a position where the readers cannot detect the geometric design, position and other graphics of the secure glyph.
Figure 9:
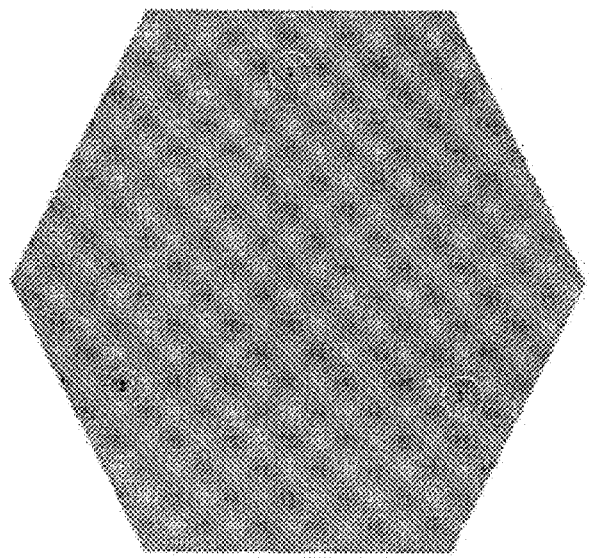
FIG. 9 illustrates a secure glyph with 6-fold rotational symmetry and three readers in which the geometric design, position and other graphics of the secure glyph are fully identified by the readers.
Figure 10:
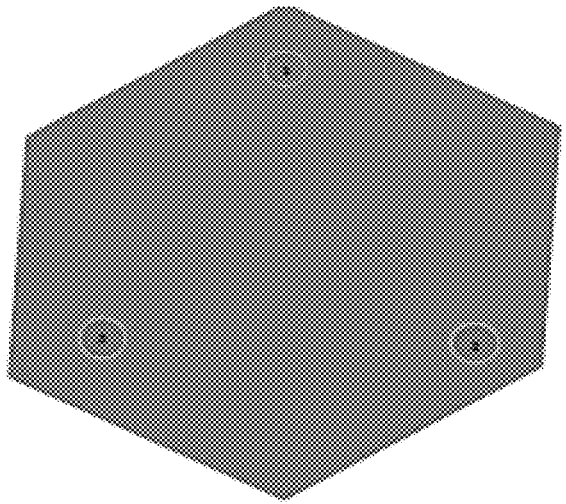
FIG. 10 illustrates a secure glyph with 6-fold rotational symmetry and three readers in which the geometric design, position and other graphics of the secure glyph are fully identified by the readers, even though the orientation is not the same as that in FIG. 7.

Examples of secure glyphs having a regular polygonal shape are shown in FIGS. 7 and 8 whilst a secure glyph having a star shaped regular polygonal shape is shown in FIGS. 5 and 6.

Consequently a secure glyph shaped as shown in FIGS. 7 and 8 can be read at a plurality of points regardless of orientation, whereas a secure glyph shaped as shown in FIGS. 5 and 6 a positive recognition requires the correct orientation.

Alternatively the secure glyph may be designed so as to lack rotational symmetry. Secure glyphs lacking in rotational symmetry include: numbers, letters, words, marks, characters (including, but not limited to, those used to represent words in Chinese, Japanese and Korean languages), hieroglyphs (including those, for example, used to represent words in ancient Egyptian), pictograms and the like.

Authentication Reader

In one embodiment of the present invention, the authentication reader will read the entire secure glyph.

However, in an alternative embodiment the authentication reader will only read certain points or sectors of the secure glyph and this allows for a greater expression in the design of the secure glyph and for reprogramming the authentication apparatus to sample different areas of the secure glyph, either in response to counterfeiting or in response to a change in the secure glyph or another readable security feature of the secure glyph.

Advantageously, the secure glyph is provided with a means to normalize its orientation, such as an orientation mark or symbol so that the authentication reader recognizes the secure glyph in a consistent manner.

This normalization can be accomplished by providing a further reader that reads a fixed point, line or shape appearing at another location on the object or product and providing a means to compute the relative orientation and location of the secure glyph by coupling the readings together.

Furthermore, the secure glyph may consist of a physical structure that exhibits different heights from the surface of the object or product, a so-called 3D effect and the reader detects the location of the secure glyph at varying heights above the surface of the object or product.

One non-limiting example of this embodiment is a concave mirror (circular, paraboloidal or elliptical) which, when interrogated with light, will have the property of refocusing said light back to a point or to a line. Another non-limiting embodiment is a microlens array that when interrogated with light, particularly, but not limited to the visible wavelength light, there will be a definite reflected pattern of light that may be used both to authenticate and to visualize the secure glyph.

Machine Readable Feature

The machine readable feature is typically selected from upconverters, downconverters, infra-red radiation absorbers, quantum dots, RFID antennae, fluorescent compositions, liquid crystals, electro-kinetic materials, thermochromic materials, photochromic materials, piezochromic materials, sonochemicals, magnetic materials such as ferromagnetic, antiferromagnetic, ferrimagnetic, and paramagnetic materials, combinations of dyes or pigments readable by multi-spectral imaging, materials readable by Raman spectroscopy and combinations thereof.

Preferably, suitable machine readable features may be formed from materials such as fluorescent dyes, pigments, nano particles that are visible or invisible in natural or room light, dyes such as silicon 2,3-naphthalocyanine bis(trihexylsilyloxide), and/or other metal complexed naphthalocyanine compounds, and/or other cyanine, naphthocyanine or phthalocyanine dyes; glass encapsulated nanoparticles such as CdTe, CdSe, PbS, PbSe, InAs; phosphors such as YAG:Nd, $Al_2O_3$:Nd, and/or various other phosphor based IR active nanoparticles.

Advantageously, the machine readable feature is preferably made of fluorescent taggant materials that produce an emission spectrum or signal response when the secure glyph is exposed to a certain excitation source, such as electromagnetic frequencies, e.g. X-ray, UV (Ultraviolet) light, visible light or IR (Infrared) light. The emission spectrum may be in the UV, visible or IR spectral ranges.

The material or materials for the machine readable feature may be organic or inorganic and may be a solid, such as a powder, a liquid, and/or a solid dissolved in a liquid or form a suspension or dispersion in a liquid. Each fluorescent taggant material will have its own characteristic excitation pattern and emission spectrum.

A combination of secure glyphs using different materials, in different ratios, having, for example, different characteristic excitation patterns and emission spectrums, or the cascade of the emission spectrum of one secure glyph to excite the emission spectrum of a second secure glyph may also be used as the machine readable feature.

As a further example, a mixture of materials for the machine readable feature may have the same or different excitation wavebands and thus when a mixture of taggant materials is used, not only are the individual emission peaks of each material considered, the whole spectrum profile for that particular mixture is also important.

Thus, even for a single peak emission, emission amplitudes of neighboring wavelengths may also be measured and taken into account. In addition, for some fluorescent taggant materials, employed in the invention, the dynamic characteristics of the emission, such as the emission response time and decay time may also constitute a significant secure glyph verification criteria.

Machine readable features of the secure glyphs that are covert, i.e. invisible to the naked-eye, include irreversible thermochromic or photochromic taggant materials. These taggant materials are typically interrogated by irradiation using a reader having a suitable and appropriate type of heat or light source that would render the secure glyph visible to the naked-eye due to a physical change in the state or property of the taggant material.

Typically, secure glyphs that are invisible to the naked-eye include ultraviolet-active photoinitiators. Together with an ultraviolet-crosslinkable component incorporated therein these taggant materials, upon irradiation with a suitable and appropriate ultraviolet light source, become visible to the naked-eye as a result of the photoinitiation and the change in the refractive index of the taggant material.

Furthermore, secure glyphs that are invisible to the naked-eye and, interrogated by a reader singularly or in a plurality of ways or having more than one type of readable features, may be formed from rare earth oxides or sulfides. These taggant or other types of machine readable materials, when interrogated by electromagnetic radiation display both upconversion and downconversion readable properties. A non-limiting example of a secure glyph displaying down conversion properties would be a combination of a colored pigment having unique spectral characteristics with a Raman-active secure glyph such as that described in U.S. Pat. No. 6,610,351.

It will be appreciated by one of ordinary skill in the art that incorporating a taggant material into a secure glyph that provides for a change in the reader visualization of the secure glyph during interrogation, need not be the sole security or authenticating feature offered by the secure glyph.

The secure glyphs of the present invention may be interrogated by an authentication reader in more than one manner, e.g. either as a singular secure glyph or plurality of secure glyphs or by incorporating one or more of the above-mentioned taggants into the secure glyph.

In a further embodiment of the present invention, there may be one or more secure glyphs present on the object or product which may be the same or different in their design or in the type of secure glyph or readable security feature each possesses.

Furthermore at least one additional secure feature may be positioned on or in association with the object or product.

In particular the at least one additional secure feature may be a second secure glyph or it may be a secure feature interrogatable by the same or different means as the first secure glyph. The additional secure feature may be read by the same reader as the secure glyph or it may be read by a second device either remote from or integral to the first reader.

One advantage of this particular embodiment is that a counterfeiter of the secure glyph will not be able to use counterfeit object or product because the authenticating apparatus will still recognize the object or product as non-authentic. It will be appreciated that the authenticating apparatus may be configured, under these circumstances either to overall reject the object or product as non-authentic, or to accept the visualization of the counterfeited secure glyph, and so display the trademark or other intellectual property comprised in the secure glyph. This would render the counterfeiter an unauthorized user of a trademark or other intellectual property associated with the glyph.

Method for Producing Objects or Products

The present invention also provides an object or product with a secure glyph thereon and a method of producing the object or product.

The object or product is typically a beverage dispenser cup, a lid, cover or label.

The secure glyph may be incorporated into the object or product during its manufacturing process by mixing a taggant material used to form the machine readable feature of the secure glyph into the raw materials of the object or product and thus the machine readable feature becomes an integral part of the object or product.

In particular, when the taggant material used is a powder, it may be mixed with plastic beads, fillers or adhesives or incorporated into substrates such as textiles, woven fabric, non-woven fabric, thread fibers, cardboard, concrete, polymer, glass, wood, paper (including currency, certificates, licenses, identification cards, and passports) metal, plastic, ceramic, cloth and leather.

Alternatively, the secure glyph may be embossed onto an object or product, or attached to the object or product with an adhesive.

Preferably the secure glyph is printed or coated onto the surface of an object or product using a printing ink, paint, epoxy or lacquer.

A combination of the above-mentioned application techniques may be employed.

Authentication

The present invention also provides an authenticating apparatus which comprises a database containing data that corresponds or is associated with a signal response generated from an authentic intellectual property protected feature alone, or in combination with the machine readable feature and an authentication reader.

Preferably, the authentication apparatus includes an output device and advantageously a display unit.

The authentication reader comprises a signal generator capable of generating a signal response from the intellectual property protected feature alone, or in combination with the machine readable feature, a signal response detector capable of receiving the signal response from the intellectual property protected feature alone, or in combination with the machine readable feature and a signal processing unit (SPU) for comparing the signal response from the detector and the stored signal response in the database.

The authentication reader plays a critical role in the authentication method, as it acquires information from the secure glyph and conducts an analysis, based on the acquired information, to authenticate the object or product.

Advantageously, the acquired information may be stored in the database and may also be communicated e.g. via the internet to the brand owner of the object, or any other legitimate interested party. Furthermore the information obtained by the brand owner or other legitimate interested party may be analyzed and advantageously used to teach the authenticating apparatus improved means of recognizing the authenticity of the secure glyph on the object or product.

Additionally, the acquired information may also be used to provide a response signal to a communication device associated with the user of the object or product, such as sending a text message via Bluetooth to a smartphone informing them of a prize they have won, or directing them to a website of particular interest.

In one particular embodiment of the invention the authentication reader may detect and recognize a signal response that is representative of the entire intellectual property protected feature of the secure glyph and thus the authentication reader is considered to be in possession of the secure glyph and thus in possession of the intellectual property protected feature as well.

This is the case, for example, wherein the machine readable feature of the secure glyph is, in itself, in the form of a trademark and when the authentication reader reads the secure glyph it is also reading and using the secure glyph as the trademark that appears on the object or product.

Alternatively, the authentication reader may detect and recognize a signal response that is associated with the intellectual property protected feature and which is then compared with associated data (such a signal response) in the database whereupon the entire intellectual property protected feature of the secure glyph is generated and thus only the authentication apparatus as a whole is considered to be in possession of the secure glyph and the intellectual property protected feature.

Advantageously, in both scenarios, the intellectual property protected feature can optionally be displayed on a display unit of the authentication apparatus, which may be remote or local to the location of the secure glyph itself.

The signal generator of the authentication reader includes an excitation source that usually provides at least one light source such as a UV and/or an IR light source.

Furthermore the signal generator may include an excitation delivery source, such as light optics, a focusing lens, color filters, reflectors and optical fibers for optimized delivery to the detector.

The signal response detector of the authentication reader may include a multispectral image analyzer (hyperspectral image analyzer) capable of analyzing light from the visible and non-visible portions of the electromagnetic spectrum.

Preferably, the multispectral analyzer is an RGB (red, green, blue) sensor, used to collect the RGB components of the signal response.

Figure 4:
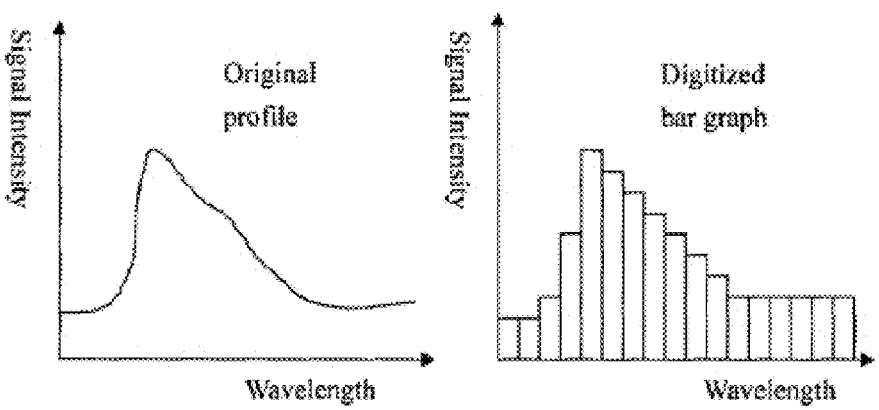
FIG. 4 shows a spectral curve with an analog signal converted to discrete digital values.

The RGB sensor has output channels for the R, G and B components and the total signal intensity (W) and provides the color of the signal responses and the total signal intensity to indicate signal concentration as illustrated in FIGS. 4 and 6. The sensor output can either be in voltage, current or pulse frequency format.

Furthermore the RGB sensor provides for three progressive levels of security in the analysis of the RGB signal emission profiles namely, the wavelengths where the emission intensity peaks, the peak wavelengths and the relative amplitudes of the peak emission intensity wavelengths and the peak wavelengths of the relative intensity amplitudes at the peak wavelengths and amplitudes of the emission intensity at "all" wavelengths.

The emission intensities over the complete emission spectrum may be digitized to form a bar graph where the amplitude and the width of each bar is recorded and used for analysis of the signal response by the SPU. Where the complete emission spectrum for a secure glyph in the visible range is obtained, the emission color can also be calculated to serve as an additional authentication characteristic of the secure glyph. In addition, a fast response spectrometer can be set to be proportional to signal emission intensities to give one more dimension to the authentication algorithm.

Yet another layer of authentication protection may also be provided by using a response time RGB sensor wherein one can record the response time (rise time and/or decay time) of the signal response and set it as another authentication readable feature criteria. In such an embodiment, the database record would contain data for a particular secure glyph's name-RGB values, intensity, decay time-product information.

Figure 11:
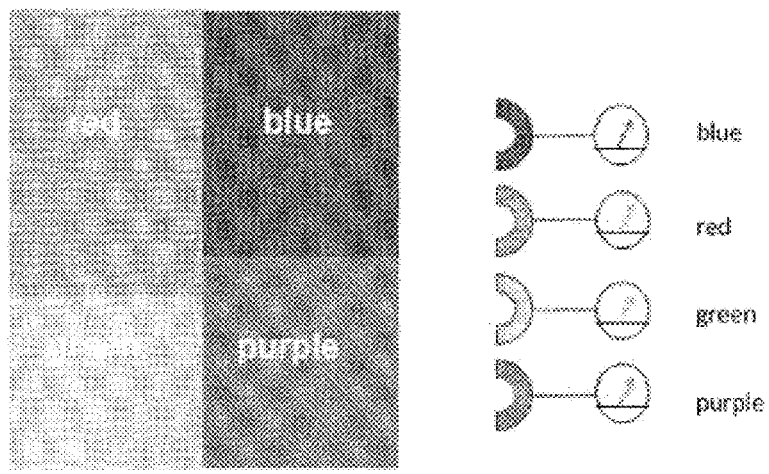
FIG. 11 shows a secure glyph having four colored areas and four color-selective readers. The signal response for each reader is proportional to the area of the secure glyph of a specified color, when the glyph is interrogated with four separate wavelengths of light and read by a reader, camera, spectrophotometer or the like capable of distinguishing those four wavelengths of light.
Figure 12:
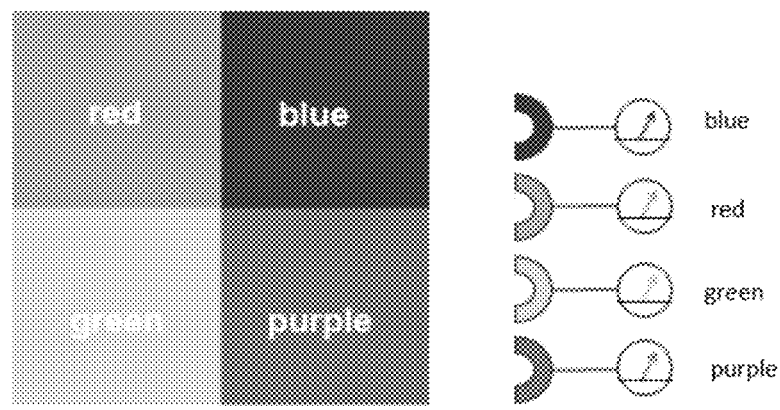
FIG. 12 shows a secure glyph having four colored areas and four color-selective readers. The signal response for this secure glyph, and thus the presence or absence of any rotational symmetry of this secure glyph (that is to say, does it appear as a single square of fourfold rotational symmetry or as four conjoined squares of no rotational symmetry) may be different depending upon which wavelength(s) of light are used to interrogate the secure glyph.
Figure 13:
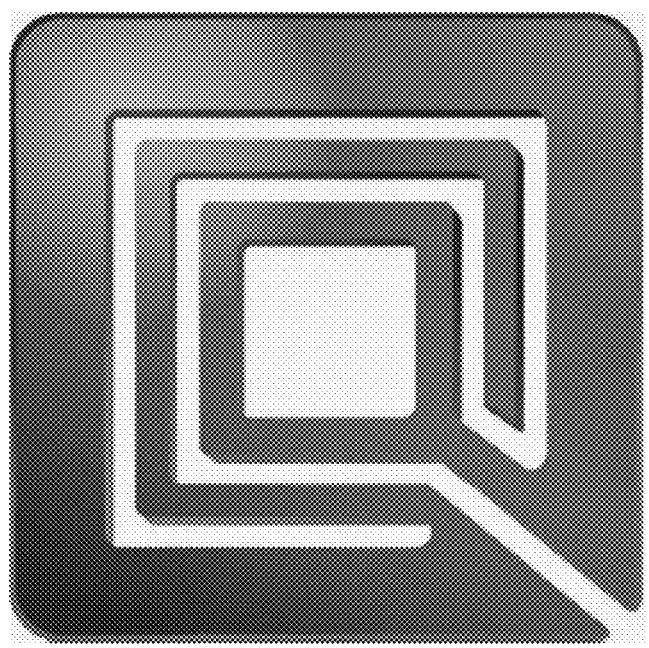
FIG. 13 illustrates a trademark glyph having three functionalities: (1) trademark function (its shape), (2) an RFID antenna function, and (3) a secure glyph function for authenticating an object or product according to the authentication system and method of the present invention.

When the secure glyph is visible to the naked-eye such as multi-colored glyph, then the intensity of the color signals emitted from the secure glyph can also be used to identify the secure glyph. The reflected light intensity will be proportional to the area of the secure glyph within the aperture of the reader. Thus using three or four colored sources, such as light emitting diodes, aimed at an area of the secure glyph, the fraction of the light sensed or read will be proportional to the area of the secure glyph printed in that color. Thus, the ratio of the R to G to B response signals will form a unique identifier for the secure glyph, without having to process the complete image of the secure glyph. Such area average identification could be defined during the design of the secure glyph on a printing plate, for example, where the area or where the secure glyph or other secure materials placed on the object or product can be determined independently from the rest of the graphics on the object or product as illustrated in FIGS. 11 and 12.

In another embodiment of the present invention, a spectrometer is used as the signal response detector to provide a high level of security. The use of such a high level detector would, for example, avoid the problem of metamerism. The signal response may have output signal intensity in a wide range of wavelengths and a resolution ranging from several nanometers to less than 1 nanometer. The use of a spectrometer also allows the complete emission spectrum profile to be obtained. The selection of the spectrometer (over applicable wavelength range, sensitivity and resolution) will depend on the physical and chemical properties and features of the taggant materials used to form the secure glyph and the signal emission wavelengths required for authentication.

In an embodiment of the present invention where a spectrometer is used, the spectrometer can have a wavelength dispersive element, able to detect the complete response spectrum for the secure glyph. The data output of the spectrometer can be in the form of the relative intensities versus wavelengths, where the emission peaks are recorded and naturally become the fingerprint of the readable security feature for the secure glyph.

In another embodiment of the invention provides object or product authentication wherein the secure glyph is covert, for example, using a printing ink, and generates a fluorescent signal response that results from being excited by an ultraviolet or infrared excitation source. The signal response generated will be in three different colors. The authentication reader will typically perform at least three different spectral characteristics, either by nature (such as an LED being connected as photodiode) or by the addition of a color filter that matches the signal response of the fluorescent colorants used in the taggant material to formulate the secure glyph.

The signal response detector is configured to send a signal response to the SPU. After receiving the signal response, the SPU performs a diagnostic analysis and retrieves the related secure glyph property data from the database and compares this with the signal response received from the signal detector.

The results of the comparison are then typically sent to an output device which allows the machine to function or prevents the machine from functioning. Preferably the output device includes display unit which provides notification to a user of the result either audibly, preferably visually.

The analysis hardware and output device may be a desktop or notebook computer. Furthermore the output device may be a standalone mobile application device (field type), having analysis hardware, an SPU and associated electronic circuitry. The output could appear on a small liquid crystal display panel, or other type display. The database may either be built-in to the authenticating apparatus or be connected to the apparatus via a wired or wireless means, such as the internet or an intranet.

The authenticating apparatus may also include one or more input devices for the user to input commands to direct or interact with the authentication apparatus. The format for the data representing the signal emission will depend on the signal emission detection device used.

The authentication reader may further generate an output, which can be connected to an SPU configured for outputting the result of the authentication, to a manufacturer or user of an article, object or product subject to the authentication. The reader may, for example, upon failing to authenticate a trademark glyph affixed to an article, object or product, send a command to the authentication apparatus to cause the, object or product or a device using the article, object or product to cease functioning.

It will be appreciated that the value of this authentication reader functional aspect where a user of a counterfeit, object or product is attempting to force the use or acceptance of the counterfeit, object or product. The loss stemming from any failure to use the object or product or any article or device associated with the object or product can cause a user to contact the manufacturer in order for the object, product, article or device to become functional again.

By such a means, the manufacturer of the object, product, article or device can limit counterfeiting and develop data on the counterfeiting. Thus the lock-out and reporting aspect for the authenticating apparatus and method of the present invention can be commercially valuable for ink jet cartridges, pharmaceuticals, vaccines, beverages and beverage and vending dispensing machines and many other industrial articles, items and machines of various types.

In a further embodiment of the present invention, the authentication reader may be designed to read and, optionally, visualize the secure glyph and additionally have the capability to read numerous pixels of information thereby capturing the shape and orientation of the secure glyph.

The visualization could be provided by a miniature camera that is either monochrome, or full color. In one particular embodiment, where the entire geometric shape of the secure glyph is visible to the naked-eye using a camera, there is no requirement that the secure glyph be designed to have rotational symmetry. Furthermore the camera captured image can be rotated or processed using mathematical procedures and image processing.

Additionally, another layer of authentication protection is gained when the total signal intensity of a signal response serves as an additional verification criteria relating to the concentration of the taggant material forming the secure glyph. Therefore, for a certain object or product, one may simply double such concentration to make a difference in the readable features of the secure glyph.

The present invention also provides a machine with the above mentioned authenticating apparatus incorporated therein or associated therewith.

The machine could be an inkjet printer, a vending machine or a brewing machine.

The present invention also provides a method for allowing for an object or product having a secure glyph thereon to be accepted and used for a specific intended purpose in a machine associated with the authenticating apparatus as herein described above.

The method involves using the authenticating apparatus incorporated within or associated with a machine to detect and recognize the intellectual property protected feature alone, or in combination with at least a portion of the machine readable feature on a secure glyph and subsequently authorizing or allowing the intended use object or product in or with the machine.

Furthermore the method may include initially affixing or attaching the secure glyph to the object or product, printing or coating the glyph onto the object or product and/or incorporating the glyph into the object or product.

The present invention also provides a system for allowing a first article to be used in combination with a second article comprising;

a) authenticating the first article with a glyph thereon by detecting a characteristic feature of the glyph with a detector; and b) allowing the first article to be used in combination with the second article.

Advantageously, the glyph is a secure glyph is herein defined above.

Finally, the present invention provides an authentication method for determining the authenticity of an object or product having a secure glyph thereon comprising:

affixing or attaching thereto, printing or coating thereon and/or incorporating therein onto the object or product a secure glyph having an intellectual property protected feature; and a machine readable feature having a covert, and optionally an overt portion; wherein said intellectual property protected feature is recognized either alone as a machine readable feature; or recognized in combination with at least a portion being a machine readable feature; by an authenticating apparatus to determine authenticity;

subjecting the object or product with the secure glyph affixed to an authenticating apparatus to determine authenticity having a database containing associated data corresponding to a signal response from an intellectual property protected feature alone, or combination with a machine readable feature; and an authentication reader having: a signal generator capable of generating a signal response from an intellectual property protected feature alone or in combination with the machine readable feature on the secure glyph; a signal response detector capable of receiving the signal response from the intellectual property protected feature alone, or in combination with the machine readable feature; and a signal processing unit (SPU) for comparing the signal response from the detector and the relevant associated data in the database; and acknowledging the output from the authentication reader.

Figure 3:
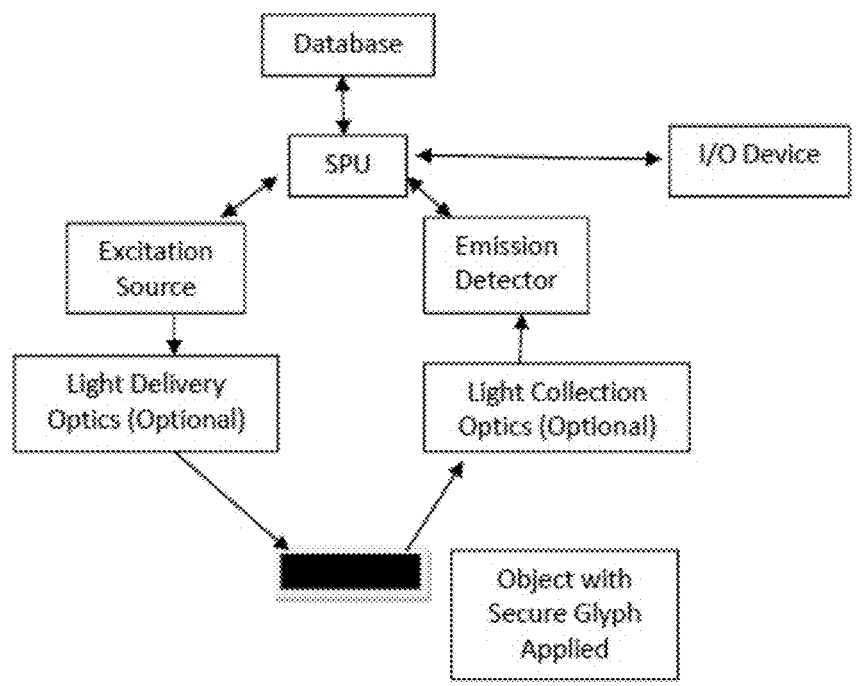
FIG. 3 shows a block diagram of an authentication apparatus according to an embodiment of the present invention.

In a particular embodiment of the present invention, the object or product authentication includes applying or incorporating a secure glyph to the object or product; a database storing data related to the signal response properties of the secure glyph; and an authentication reader having a signal generating or excitation source for emitting a signal towards the secure glyph for a signal emission or response detection by the reader, and a signal processing unit (SPU) for analyzing the signal response and comparing the signal response with the data in the database as illustrated in FIGS. 3 and 5, thereby verifying the identity and authenticity of the object or product containing the secure glyph or having it applied thereto.

The information so obtained may further either remain stored in the database or may be communicated, e.g. via the internet to the brand owner of the object. It is also a feature of this invention that the information so obtained by the brand owner may be analyzed and used to teach the reader device improved means of recognizing the authenticity of the secure glyph on the object. Another possibility is to program the reader device to seek a secondary authentication measure for the object. These features are of special utility when (a) a counterfeiter uses an authentic object of the owner, containing an authentic secure glyph, where the reader and/or human have little reason to not believe that object and secure glyph are authentic, or (b) a counterfeiter produces a close match to the secure glyph that might fool the reader and/or human into believing that the close match to said secure glyph is in fact authentic. By either of these means, false positives can be detected or avoided and the apparatus reading the secure glyph can be taught to differentiate between forgeries and authentic secure glyphs or be taught to reference some other information that has been input into the reader device to further enhance or improve its ability to recognize the authenticity of secure glyphs and the objects containing them.

The information so obtained from the data base may also, in this instance, be conveyed to the police or to another local or governmental security organization, in order to apprehend counterfeiters and eradicate counterfeiting and unlawful uses and representation of trademarks, trade names, copyrighted materials and other intellectual property.

If the readable feature of a trademark glyph for determining a counterfeit trademark that is used on or in association with an object or product is visible to the naked eye, trademark infringement could be established immediately by the owner of the object or product. If the readable feature of the trademark glyph is hidden to invisible to the naked eye, then a secondary exposure source would be required to visualize the trademark glyph at some point during or throughout the use of the object or product. A hidden or invisible trademark glyph would add yet another level of authentication security to an object or product, since it would not be immediately clear to the counterfeiter why their counterfeit object or product is being rejected and unacceptable, even though it would appear to look and function the same, and contain the same readable features as the authentic object or product. Also, a hidden or invisible trademark glyph would preferably not impede the view or appearance of any other marketing or decorative design or advertising appearing on the object or product.

The important and distinct advantage the present invention provides, is that the authentication apparatus is not only looking for the presence of a naked-eye visible and reader visible feature of the secure glyph applied on the object or product for authentication, but is also simultaneously or sequentially looking to visually identify and authenticate the secure glyph itself as, for example, a trademark, trade name or logo, where such visual identification offers another level of verification and authentication for the object or product.

In another embodiment, a secure or trademark glyph is hidden or invisible and is subsequently visualized to the naked-eye by use of a reader that interrogates the secure glyph and displays the trademark glyph on a remote analog or digital display screen associated or part of the object or product. In this fashion, the trademark glyph is still connected with the object or product it is intended to represent and provides for a secondary visual validation of the secure or trademark glyph during the authentication of the object or product containing the trademark glyph. Optionally, display of the secure or trademark glyph may be accompanied by a validating, safety or advertising message or signal, for example "authentic product" or "good to consume" or "caution when handling hot beverages", "call this number for a free sample" or a check mark or smiley face, appearing on the display screen, in monochrome or full color. Those of ordinary skill in the art will realize that other messages, codes and signals, including those that may represent monetary value, can be generated by using the secure or trademark glyph of the present object and product authentication apparatus. Further optionally, the display of a secure or trademark glyph may be used following normal use of the object to verify the remains of said object in order to derive further value for the consumer of said object, for example by proving that the object qualifies for a rebate or a gift.

In a further embodiment, the secure or trademark glyph is hidden or invisible and printed on an interior surface of an object or product. For example, the interior surface of a laminated flexible packaging material, wherein the assembly is substantially transparent through at least one surface, to facilitate a means of interrogating the hidden or invisible trademark glyph. Through at least the one transparent surface, that is also substantially transparent to visible radiation, a secure or trademark glyph comprised of a fluorescent taggant material can be subjected to excitation at wavelengths of infra-red radiation that the secure or trademark glyph absorbs. The secure or trademark glyph may also be applied as an adhesive, rather than a printing ink, on the substrate of the object or product in such fashion as to accurately represent the geometric design of the secure or trademark glyph.

The present invention has been described in detail, including the preferred embodiments thereof. However, it will be appreciated that those skilled in the art, upon consideration of the present disclosure, may make modifications and/or improvements on this invention that fall within the scope and spirit of the invention. The following examples illustrate specific aspects of the present invention and are not intended to limit the scope thereof in any respect and should not be so construed.

Example 1—Authentication of an Overt Secure Glyph on an Object

A glyph for an object was provided having an n-fold rotational symmetry of 4 and which the intellectual property protected feature was visible to the naked-eye by applying a printing ink or coating containing a taggant onto the object by known application methods.

The object was then interrogated by a handheld machine reader and authentication conducted by both the naked-eye and the reader.

Example 2—Authentication of a Covert Trademark Glyph on an Object and Use with a Machine A trademark glyph was provided having an n-fold rotational symmetry of 4 and which was invisible to the naked-eye by applying a printing ink or coating onto the lid of the single use beverage dispensing cup to create the design and form of the trademark.

The beverage dispensing cup is inserted into a beverage dispensing machine or brewer, where upon insertion, the trademark glyph becomes visible to the naked-eye. The beverage dispensing cup is then subjected interrogation by an authentication apparatus incorporated within the machine and the trademark glyph is displayed a visual display on the dispensing machine.

Upon interrogation, the beverage dispensing cup is subjected to identification and authentication by the machine reader and the process of using the beverage dispensing cup either continues or is halted based on the results of the authentication for the trademark glyph appearing on the lid of the beverage dispensing cup.

Upon authorization of the trademark glyph, the beverage dispenser continues its operation and a beverage is brewed and dispensed.

At the point where the authentication occurs and is verified, the trademark glyph causes a trademark, logo or message to appear on the display screen of the dispensing machine, and additionally a message such as 'ENJOY YOUR GENUINE BREW" or "AUTHENTICALLY BREWED" is also displayed.

The trademark, logo or message continues to appear on the machine's display screen throughout the brewing and dispensing process until completion. The spent brewing cup may then be taken to a second authentication center, where, upon presentation of said spent cup to a second reader, a rebate or prize may be offered to the holder of the spent cup. Upon non-verification of the trademark glyph, the dispensing machine does not brew or dispense a beverage and a message appears on the display screen notifying the user. The unused counterfeit beverage dispensing cup is then either deposited in a repository, or otherwise held or rejected.

Example 3—Authentication of an Overt Trademark Glyph on an Object and Use with a Machine A trademark glyph for an ink-jet cartridge for use in an ink-jet printer was provided which was visible to the naked-eye. A printing ink or coating containing a secure glyph is patterned deposited onto an ink-jet printer cartridge to create the design and form of the trademark glyph using a known application methods.

Trademark glyph design can be any shape because the ink-jet cartridges preferably may only be inserted into the printer in one way, so the orientation of the cartridge is mandated by the printer.

The ink-jet cartridge is then inserted into a printer and subjected to a means for interrogating the trademark glyph by a reader.

Upon interrogation of the trademark glyph, the ink-jet cartridge is subjected to identification and authentication by the reader and the process of using the ink-jet cartridge in the printer either continues and accepts the ink from the cartridge or does not accept the ink and the printer will not print.

Optionally, the printer may be further be disabled, either temporarily or permanently until an authentic ink-jet cartridge has been authenticated by the reader. A further option could require that a message be sent from the printer, for example, via the internet, or a digital or analog screen display, to alert the user or manufacturer of the printer about the non-verification.

Example 4—Authentication of a Covert Trademark Glyph on an Object and Use with a Machine A trademark glyph for an ink-jet cartridge for use in an ink-jet printer is designed to be invisible to the naked-eye. A printing ink or coating containing a secure glyph is patterned deposited onto an ink-jet printer cartridge to create the design and form of the trademark glyph using a known application method.

The trademark glyph design can be any shape because the ink-jet cartridges preferably may only be inserted into the printer one way, so the orientation of the cartridge is mandated by the printer. The ink-jet cartridge is then inserted into a printer. Upon insertion into a printer, the trademark glyph becomes visible to the naked eye and is subjected to a means for interrogating the trademark glyph by a reader, wherein the reader is a handheld, machine readable, or visual display, or a combination thereof.

Upon interrogation of the trademark glyph, the ink-jet cartridge is subjected to identification and authentication by the reader and the process of using the ink-jet cartridge in the printer either continues and accepts the ink from the cartridge or does not accept the ink and the printer will not print.

Optionally, the printer may be further be disabled, either temporarily or permanently until an authentic ink-jet cartridge has been authenticated by the reader. A further option could require that a message be sent from the printer, for example, via the internet, or a digital or analog screen display, to alert the user or manufacturer of the printer about the non-verification.

Example 5—Authentication of an Overt Trademark Glyph on an Object and Use with a Machine A trademark glyph for a vending machine is provided to be visible to the naked-eye. A printing ink or coating containing a secure glyph is patterned deposited onto items found in the vending machine to create the design and form of the trademark glyph using a known application methods.

The trademark glyph may optionally be an integral part of the substrates making up the items found in the vending machine, including but not limited to bottles, cans, candy, potato chips, chewing gum, etc. Preferred trademark glyph designs have n-fold rotational symmetry greater than 3 and most preferably greater than 4 for ease of readability.

The items placed in the vending machine and, upon purchase, are subjected to a means for interrogating or authenticating the items identity by a reader wherein the readable feature is machine readable.

Upon verification of the trademark, preferably the vending machine dispenses the product. Upon non-verification of the trademark glyph, preferably the vending machine does not dispense the product and may return any money paid for the product.

Optionally, the vending machine may be further disabled, either temporarily or permanently. Optionally, a message may be sent from the vending machine, for example, via the internet, to alert the manufacturer of the vending machine or the manufacturer of the dispensed goods about the non-verification.

Example 6—Authentication of an Overt Trademark Glyph on an Object and Use with a Machine A trademark glyph for a detergent pouch, such as a dishwasher or clothes washer detergent pouch is designed to be visible to the naked-eye. A printing ink or coating containing a secure glyph is patterned deposited onto the pouch to create the design and form of the trademark glyph using a known application methods.

Preferred trademark glyph designs have n-fold rotational symmetry greater than 3 and most preferably greater than 4 for ease of readability.

The pouch is placed in the dishwasher or clothes washer and subjected to a means for interrogating or authenticating the pouches identity by a reader wherein the readable feature is machine readable.

Upon verification of the trademark glyph, the washer uses the soap dispensed by the pouch and runs a cycle. Upon non-verification of the trademark glyph, the washer does not use the soap dispensed by the pouch nor does it run a cycle.

Optionally, the washer may be further disabled, either temporarily or permanently. Optionally, a message may be sent from the washer, via the internet or to an analog or digital display screen to alert the manufacturer or user of the detergent pouch about the non-verification.

Example 7—Authentication of a Covert Trademark Glyph on an Object and Use with a Machine A trademark glyph for a detergent pouch, preferably a dishwasher or clothes washer detergent pouch is designed to be invisible to the naked-eye.

A printing ink or coating containing a secure glyph is patterned deposited onto the pouch to create the design and form of the trademark glyph using a known application methods.

Preferred trademark glyph designs have n-fold rotational symmetry greater than 3 and most preferably greater than 4 for ease of readability. The pouch is placed in the dishwasher or clothes washer.

When the pouch is inserted into the dishwasher, the trademark glyph becomes visible to the naked-eye and subjected to a means for interrogating or authenticating the pouches identity by a reader wherein the readable feature is machine readable.

Upon verification of the trademark glyph, the washer uses the soap dispensed by the pouch and runs a cycle. Upon non-verification of the trademark glyph, the washer does not use the soap dispensed by the pouch nor does it run a cycle.

Optionally, the washer may be further disabled, either temporarily or permanently. Optionally, a message may be sent from the washer, via the internet or to an analog or digital display screen to alert the manufacturer or user of the detergent pouch about the non-verification.

Example 8—Authentication of a Covert Trademark Glyph on an Object and Use with a Machine A trademark glyph for a pouch or capsule suitable for dispensing a biological fluid, vaccine, pharmaceutical or a medical preparation is provided which is invisible to the naked-eye.

An adhesive composition containing a secure glyph is formulated and patterned deposited, via spot coating, on a flexible substrate, for example a polyester, to create a machine-readable trademark glyph feature invisible to the naked eye.

A preferred trademark glyph design has n-fold rotational symmetry greater than 3 and most preferably greater than 4 for ease of readability. The trademark glyph may optionally be an integral part of the substrate making up the flexible substrate.

The flexible substrate is then laminated to a second flexible substrate, for example a nylon, and the laminated sheet is then further fabricated into a pouch or capsule suitable for dispensing a biological fluid, vaccine, pharmaceutical or a medical preparation. The pouch in use is inserted into a dispenser, for example a medical inhaler or a syringe and is only capable of being punctured to yield up its contents upon authentication of the trademark glyph by a reader in the dispenser.

Upon verification of the trademark glyph, the dispenser dispenses the biological fluid, vaccine, pharmaceutical or medical preparation and upon non-verification of the trademark glyph, it disables the dispenser, either temporarily or permanently.

Optionally, a message may be sent from the dispenser, via the internet or to an analog or digital display screen to alert the manufacturer or user of the dispenser about the non-verification.

Optionally, the dispenser is provided with a display screen so that a message of authentication and any other valuable information derivable from the trademark glyph, for example the identity of a pharmaceutical and its dosage, can be displayed upon authentication. Such a system may be employed advantageously to authenticate, for example, the identity of an orally dispensed polio vaccine.

Example 9—Authentication of a Covert Trademark Glyph on an Object

A series of trademark glyphs for a vending machine are provided that are visible to the naked-eye. A series of printing inks or coatings containing secure glyphs are patterned deposited onto the items found in the vending machine to create the design and form of the two trademark glyphs using a known application methods.

Each trademark glyph comprises at least one readable feature. The trademark glyphs may optionally be an integral part of the substrates making up the items found in the vending machine, including but not limited to bottles, cans, candy, potato chips, chewing gum, etc.

Preferred trademark glyph designs have n-fold rotational symmetry greater than 3 and most preferably greater than 4 for ease of readability. The items placed in the vending machine and, upon purchase, are subjected to a means for interrogating or authenticating the items identity by a reader wherein the readable feature is machine readable. Said reader will read at least one secure feature on at least one of the trademark glyphs. It may be programmed to read both trademark glyphs or one only of them, or may be programmed to read the first trademark glyph then the other on a defined sequence of objects. Upon non-verification of a trademark glyph, preferably the vending machine does not dispense the product and may return any money paid for the product.

Optionally, the vending machine may be further disabled, either temporarily or permanently. Optionally, a message may be sent from the vending machine, for example, via the internet, to alert the manufacturer of the vending machine or the manufacturer of the dispensed goods about the non-verification. Upon verification of the defined number of trademark glyphs, preferably the vending machine dispenses the product. Upon non-verification of at least one of the trademark glyphs, preferably the vending machine does not dispense the product and may optionally return any money paid for the product. Optionally, the vending machine may be further disabled, either temporarily or permanently. Optionally, a message may be sent from the vending machine, for example, via the internet, to alert the manufacturer of the vending machine or the manufacturer of the dispensed goods about the non-verification.

Example 10—Authentication of an Overt Trademark Glyph on an Object and Use with a Machine A secure glyph, which also functions as a passive RFID (radio frequency identification) antenna is designed such that the intellectual property protected feature is visible to the naked-eye and have an industry common geometric shape and configuration typically seen for a standard RFID antenna (shown in FIG. 11). The secure glyph, also carries the functionality of a passive RFID antenna. The secure glyph is applied to a substrate or object as a laminated structure of aluminum or copper. Alternately, the secure glyph is formulated from a silver or copper conductive material, printed in the geometric shape and configuration on a substrate or object then cured by a standard curing method. The secure glyph is capable emitting a signal response when interrogated by a reader emitting radiation of, for example, a frequency of 13.56 MHz. Upon interrogation, the secure glyph and the object to which it is attached are authenticated by the reader. The output signal from the reader upon authenticating the secure glyph may, optionally, enable a copyrighted message, a trademark, or a trade name to display on a screen, or enable copyrighted musical notes to be played by a device interacting with the object to which the secure glyph is applied.

Figure 14:
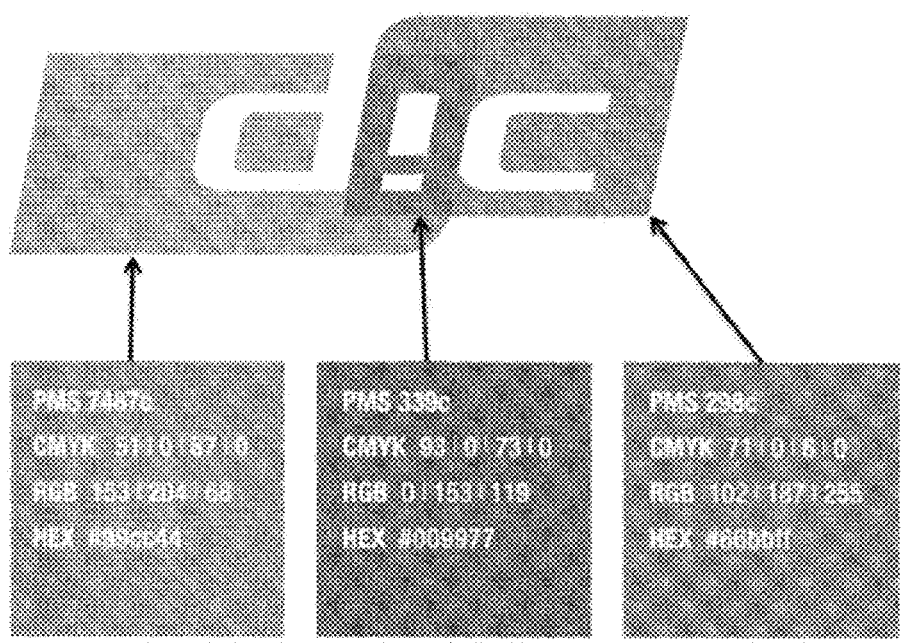
FIG. 14 shows a trademark glyph having various printed colors therein specified by known color specification systems and formed from two different printing ink formulations where at least one printing ink formulation contains a machine readable covert taggant to be read by an authentication reader.

Example 11—Production of a Trademark Glyph Containing an Overt Intellectual Property Protected Feature and a Covert Machine Readable Feature One embodiment of the present invention (shown in FIG. 14) provides a registered trademark of the DIC Corporation of Tokyo Japan as a colored trademark glyph containing a light green colored area behind the letter "d", a light blue colored area behind the letter "c" and a 2-color mixture that produces a medium blue-green area behind the letter "I".

Figure 15:
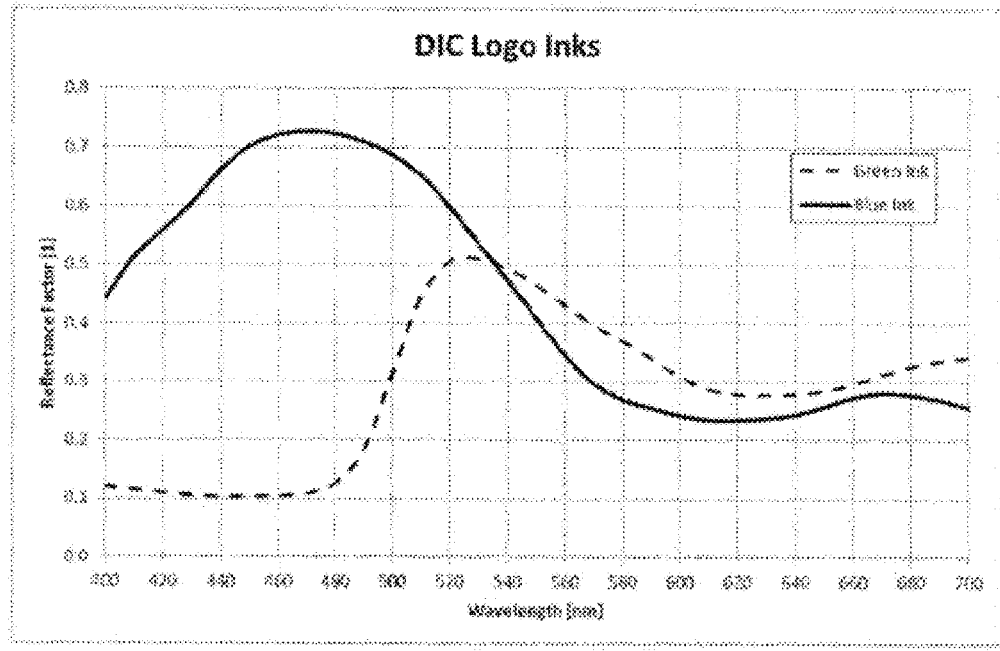
FIG. 15 shows the spectral reflectance factors for two principal colors of the printing ink formulations used to print the trademark glyph of FIG. 14.
Figure 16:
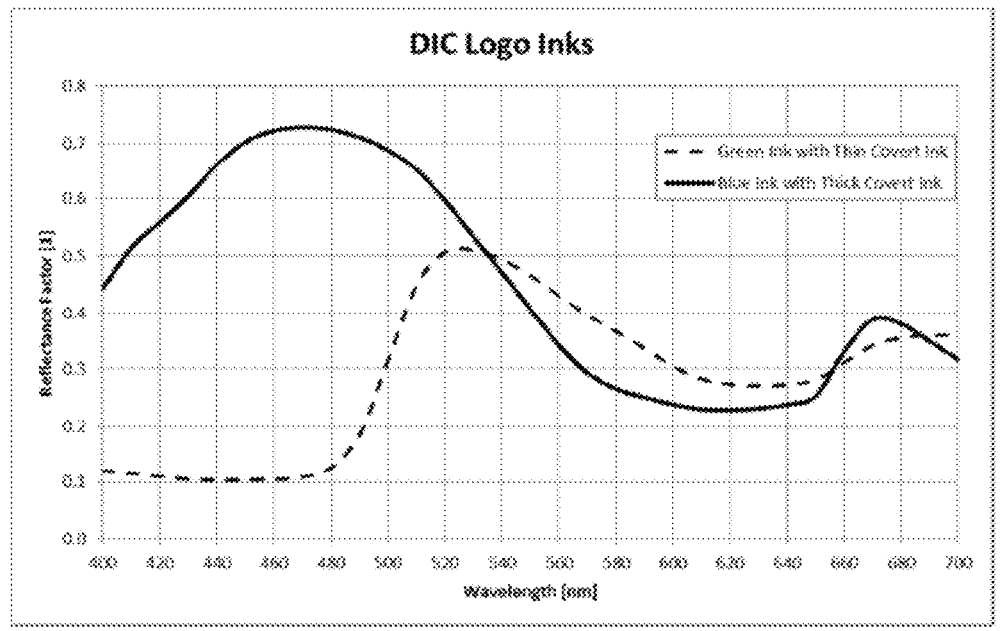
FIG. 16 shows the spectral reflectance factors for two principal colors of the printing ink formulations containing a low concentration of methylene blue as the covert machine readable taggant used to print the trademark glyph of FIG. 14.

The spectral reflectance factors of the light green color (PMS 7487) and the light blue color (PMS 298) over the visible portion of the electromagnetic spectrum for the trademark glyph were recorded (see FIG. 15). The spectral reflectance for the same two colors, overprinted with an ink containing fluorescent taggant (i.e. methylene blue) at low concentrations (so as not to markedly affect the two visual colors that downconverts, were also recorded (see FIG. 16). Each recording was made using an ISO 13655 compliant spectrodensitometer.

A small "blip" or upturn in the long wavelength tail of each color's spectral curve can be observed. This is due to the emission of the covert taggant machine readable portion of the trademark glyph and stems from when the methylene blue dye is excited with a high intensity solid state laser authenticating apparatus with a central frequency of 650 nm.

When the laser is not activated, the curves appear as they normally would. When the laser is active additional radiance is emitted from the print with the methylene blue dye and the long-wavelength "blip" signature is captured.

Figure 17:
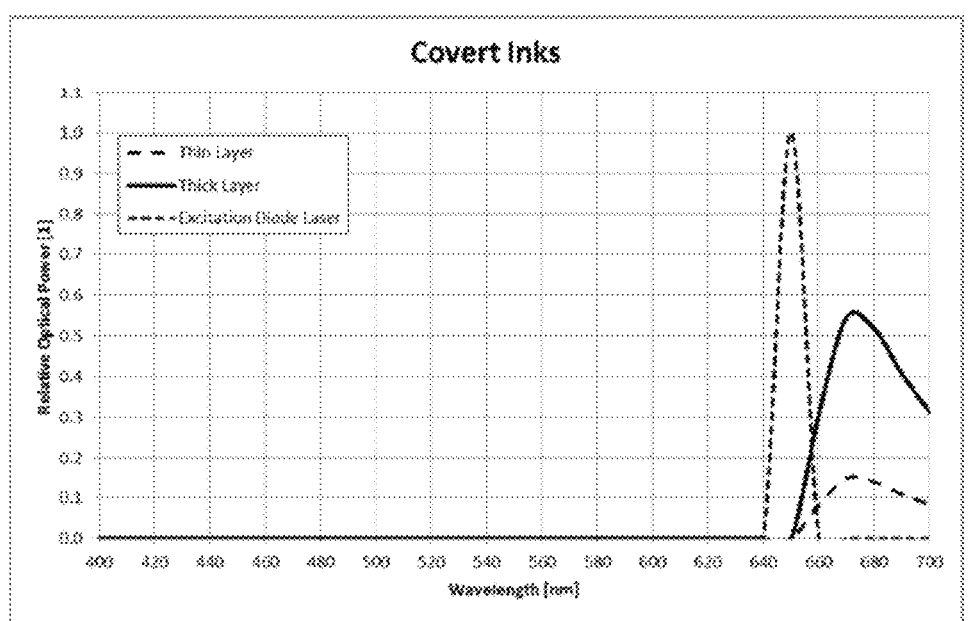
FIG. 17 shows the different emission intensities of a diode laser used to excite the methylene blue machine readable down converter taggant present in the colored portions of the trademark glyph of FIG. 14, along with two different printed film layer thicknesses for the printing ink formulations containing the taggant.
Figure 18:
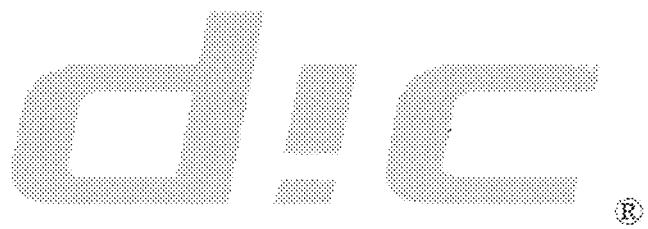
FIG. 18 shows a Level 1 security measure trademark glyph, printed with a conventional printing ink formulation. The trademark glyph is visible to the human eye and machine readable with an optical character reader or a camera used as the authenticating apparatus.
Figure 19:
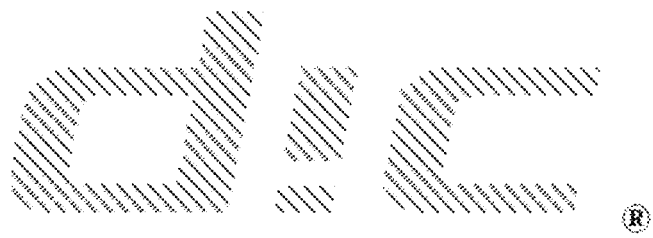
FIG. 19 shows a printed trademark glyph where the machine readable features is a printing ink formulation containing a taggant to be read by an authentication reader.
Figure 20:
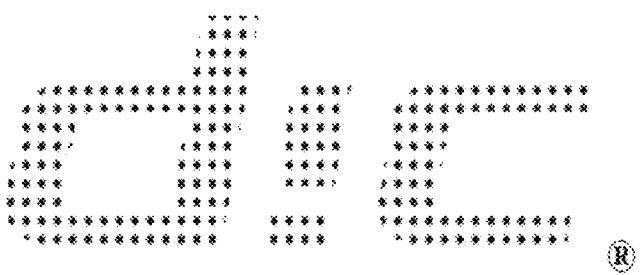
FIG. 20 shows a printed trademark glyph where the machine readable features is a printing ink formulation containing a taggant to be read by an authentication reader.
Figure 21:
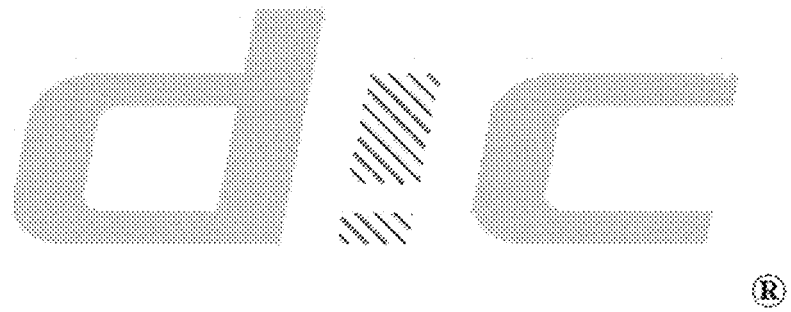
FIG. 21 shows a printed trademark glyph where the intellectual property protected feature is recognized as a combination of a conventional printing ink and a machine readable printing ink formulation containing a taggant to be read by an authentication reader.
Figure 22:
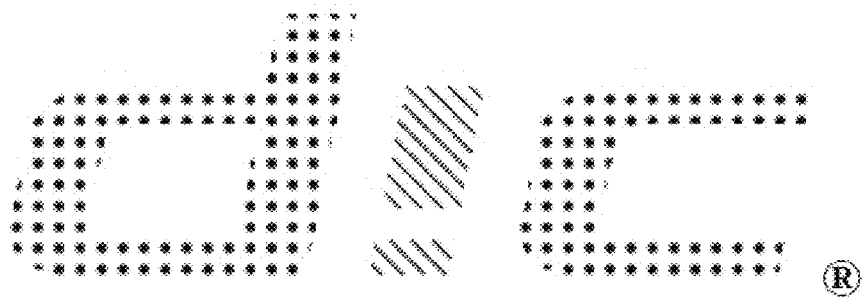
FIG. 22 shows a printed trademark glyph where the machine readable features are printing ink formulations containing different taggants to be read by an authentication reader.
Figure 23:
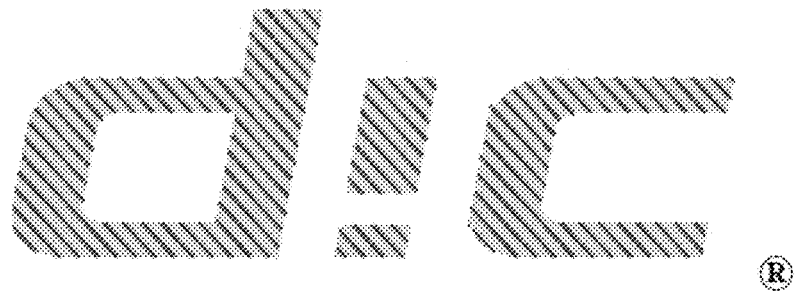
FIG. 23 shows another version of the printed trademark glyph in FIG. 21 where the intellectual property protected feature is recognized as a combination of a conventional printing ink and a machine readable printing ink formulation containing a taggant to be read by an authentication reader.
Figure 24:
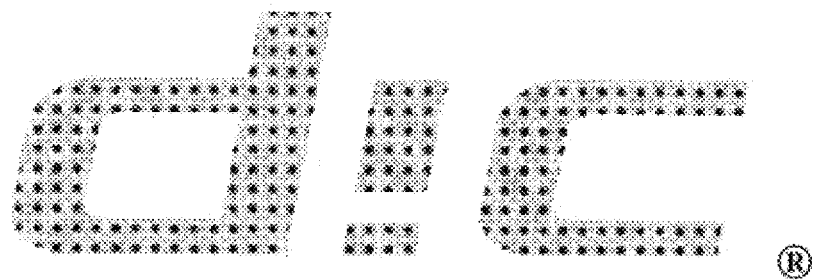
FIG. 24 shows yet another version of the printed trademark glyph in FIG. 21 where the intellectual property protected feature is recognized as a combination of a conventional printing ink and a machine readable printing ink formulation containing a taggant to be read by an authentication reader.
Figure 25:
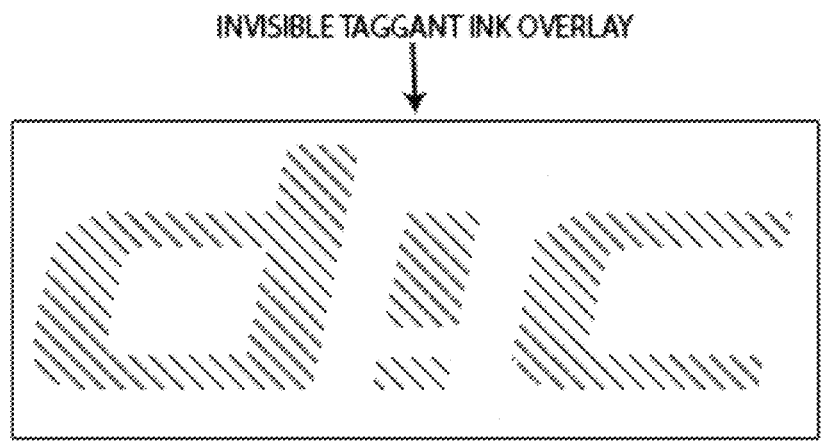
FIG. 25 shows a printed trademark glyph where the machine readable feature is a printing ink formulation containing a taggant with a taggant ink overlay.
Figure 26:
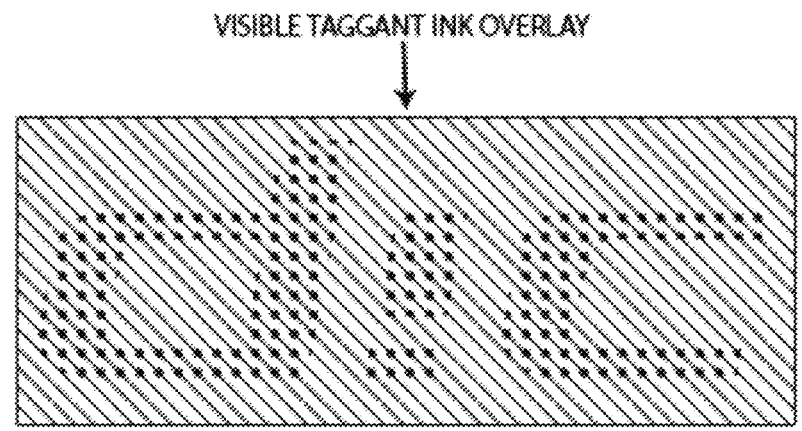
FIG. 26 shows a printed trademark glyph where the machine readable feature is a printing ink formulation containing a taggant with a taggant ink overlay.
Figure 27:
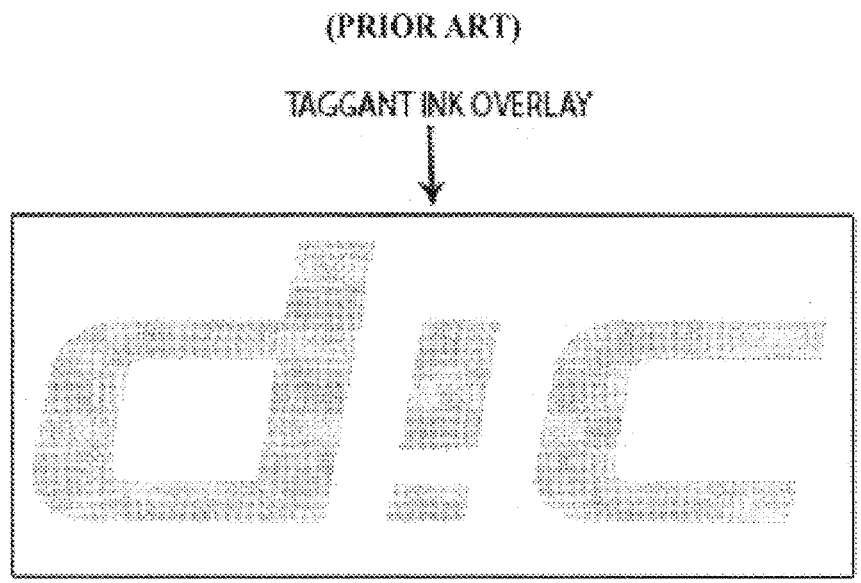
FIG. 27 represents a trademark printed by prior art techniques. More specifically, a trademark (i.e. an intellectual property feature) is printed with a conventional printing ink formulation where a machine readable overlay coating (e.g. containing a taggant) is subsequently applied. Therefore, the trademark itself is not printed such that it is capable of being recognized alone as a machine readable feature. An authenticating apparatus could not be used to authenticate the trademark since any machine read by the apparatus of the machine readable feature in the overlay and would not, in any way, be associated with the intellectual property protected feature.
Figure 28:
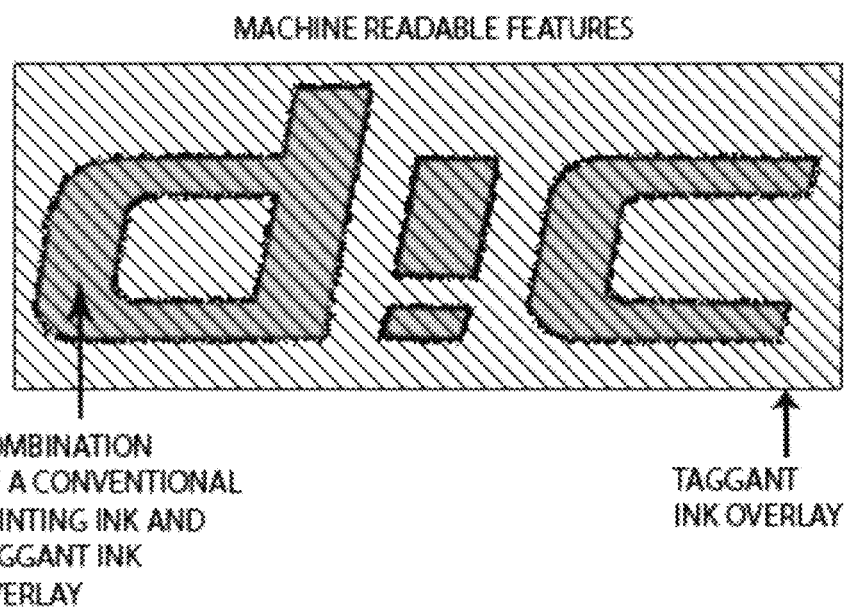
FIG. 28 represents a secure glyph where the intellectual property protected feature is comprised of two distinct machine readable features: (1) a conventional printing ink overlaid with an ink containing a taggant; and (2) an ink overlay containing a taggant. The intellectual property protected feature would be recognized via a combination of the two machine readable features upon interrogation by an authenticating apparatus.
Figure 29:
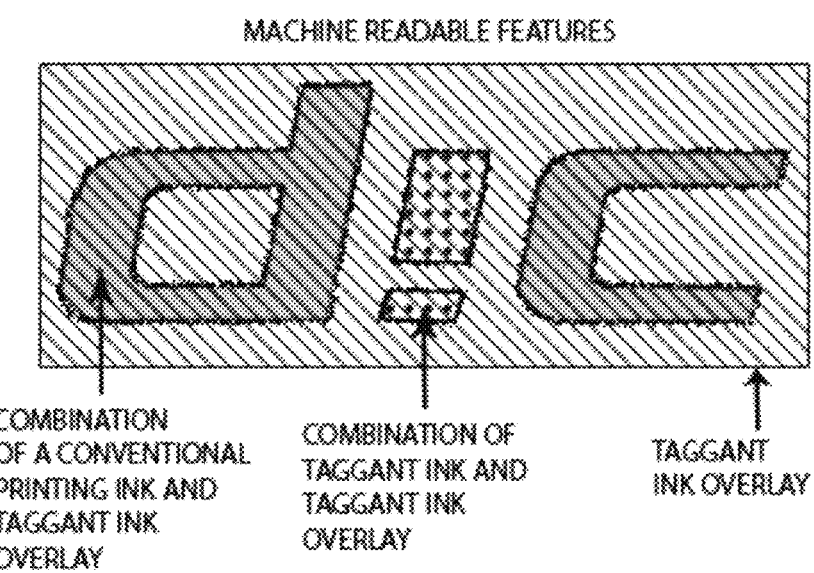
FIG. 29 represents a secure glyph where the intellectual property protected feature is comprised of three distinct machine readable features: (1) a conventional printing ink overlaid with an ink containing a taggant; (2) a combination of two taggant inks used to represent a portion of the intellectual property feature of the secure glyph; and (3) an ink overlay containing a taggant. The intellectual property protected feature would be recognized via a combination of the three machine readable features upon interrogation by an authenticating apparatus.

Finally, FIG. 17 shows the radiant emission as a second machine readable feature of the trademark glyph when the spectrodensitometer source, as measured by the authenticating apparatus, is not activated wherein the location of the laser excitation being reflected and the methylene blue emission from an unprinted portion of the substrate can be clearly seen. Furthermore, two different thicknesses produce different emission intensities as fluorescence which appears as a fairly linear process, as measured by the authentication apparatus.

The example shows that a trademark glyph, according to the present invention, can be printed on an object or product and thus allowing for a method to establish and verify that the trademark was printed and used by an authorized supplier or user of the object or product.

While several possible embodiments are disclosed above, embodiments of the present invention are not so limited. These exemplary embodiments are not intended to be exhaustive or to unnecessarily limit the scope of the invention, but instead were chosen and described in order to explain the principles of the present invention so that others skilled in the art may practice the invention. Indeed, various modifications of the invention in addition to those described herein will become apparent to those skilled in the art from the foregoing description. Such modifications are intended to fall within the scope of the appended claims. Further, the terminology employed herein is used for the purpose of describing exemplary embodiments only and the terminology is not intended to be limiting since the scope of the various embodiments of the present invention will be limited only by the appended claims and equivalents thereof. The scope of the invention is therefore indicated by the following claims, rather than the foregoing description and above-discussed embodiments, and all changes that come within the meaning and range of equivalents thereof are intended to be embraced therein.

All patents, applications, publications, test methods, literature, and other materials cited herein are hereby incorporated by reference in their entirety as if physically present in this specification.

The invention claimed is:

1. An authentication reader for authenticating a product having a fluorescent taggant ink disposed upon a surface of the product, the reader comprising:
a signal generator comprising an excitation source that provides a light source having a source wavelength or wavelengths for exciting the fluorescent taggant ink to produce a signal response of emitted light from the fluorescent taggant ink, wherein the signal response of emitted light comprises a spectrum of intensity peaks at multiple wavelengths and the multiple wavelengths are different from the source wavelength;
a RGB sensor for receiving the signal response of emitted light from the fluorescent taggant ink comprising output channels for the R, G, and B components and the total signal intensity of the signal response;
a filter, positioned between the signal generator and the RGB sensor, for blocking the source wavelength or wavelengths from the sensor; and
control circuitry coupled to the signal generator, the RGB sensor and a database containing data corresponding to signal responses associated with taggant ink, wherein the control circuitry compares the signal response with the data of an expected signal response stored in the database to determine if the signal response matches an expected signal response in the database, and positively authenticate the product as authentic when the signal response matches the data.

2. The reader of claim 1, wherein the authentication reader is incorporated into a coffee brewer.

3. The reader of claim 1, wherein the fluorescent taggant ink comprises at least one fluorescent dye and wherein the fluorescent dye, when excited by the excitation source, produces the spectrum of intensity peaks at multiple wavelengths.

4. The reader of claim 1, wherein the fluorescent taggant ink is in the form of a secure glyph having a geometric pattern.

5. The reader of claim 4, wherein the secure glyph further comprises an intellectual property protected feature which comprises at least one of an overt feature and a covert feature.

6. The reader of claim 5, further comprising a detector for detecting the intellectual property protected feature.

7. The reader of claim 4, wherein the secure glyph comprises a plurality of materials with differing ratios and differing characteristic excitation patterns.

8. The reader of claim 1, wherein the fluorescent taggant ink comprises a mixture of a plurality of taggant materials, and the plurality of taggant materials have different emission wavelengths.

9. A dispenser having the ability to authenticate a beverage containing cup comprising:
   a base unit for retaining a beverage containing cup having a fluorescent taggant ink disposed upon a surface of the cup;
   an authentication reader for authenticating a beverage containing cup comprising:
   (1) a signal generator comprising an excitation source that provides a light source having a source wavelength or wavelengths for exciting the fluorescent taggant ink to produce a signal response of emitted light from the fluorescent taggant ink, wherein the signal response of emitted light comprises a spectrum of intensity peaks at multiple wavelengths and the multiple wavelengths are different from the source wavelength;
   (2) a RGB sensor for receiving the signal response of emitted light from the fluorescent taggant ink comprising output channels for the R, G, and B components and the total signal intensity of the signal response;
   (3) a filter, positioned between the signal generator and the RGB sensor, for blocking the source wavelength or wavelengths from the sensor; and
   (4) control circuitry coupled to the signal generator, the RGB sensor and a database containing data corresponding to signal responses associated with taggant ink, wherein the control circuitry compares the signal response with the data of an expected signal response stored in the database to determine if the signal response matches an expected signal response in the database, and positively authenticate the beverage containing cup as authentic when the signal response matches the data; and
   a dispensing mechanism for dispensing a beverage via the beverage dispensing cup upon the beverage dispensing cup being authenticated.

10. The dispenser of claim 9, wherein the dispenser is a coffee brewer.

11. The dispenser of claim 9, wherein the fluorescent taggant ink comprises at least one fluorescent dye and wherein the fluorescent dye, when excited by the excitation source, produces the spectrum of intensity peaks at multiple wavelengths.

12. The dispenser of claim 9, wherein the fluorescent taggant ink is in the form of a secure glyph having a geometric pattern.

13. The dispenser of claim 12, wherein the secure glyph further comprises an intellectual property protected feature which comprises at least one of an overt feature and a covert feature.

14. The dispenser of claim 13, further comprising a detector for detecting the intellectual property protected feature.

15. The dispenser of claim 12, wherein the secure glyph comprises a plurality of materials with differing ratios and differing characteristic excitation patterns.

16. The dispenser of claim 9, wherein the fluorescent taggant ink comprises a mixture of a plurality of taggant materials, and the plurality of taggant materials have different emission wavelengths.

17. The reader of claim 1, wherein the RGB sensor provides the color of the signal responses and the total signal intensity to indicate signal concentration.

\* \* \* \* \*